(12) United States Patent
Takamura et al.

(10) Patent No.: US 10,154,522 B2
(45) Date of Patent: Dec. 11, 2018

(54) COMMUNICATION CONTROL DEVICE PROVIDING COMMUNICATION SERVICES VIA A PLURALITY OF COMMUNICATION PATHS

(75) Inventors: Kazuhisa Takamura, Chiba (JP); Nishiki Mizusawa, Kanagawa (JP); Shinichiro Tsuda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 169 days.

(21) Appl. No.: 13/484,688

(22) Filed: May 31, 2012

(65) Prior Publication Data
US 2012/0314651 A1 Dec. 13, 2012

(30) Foreign Application Priority Data

Jun. 9, 2011 (JP) .................................. 2011-128989

(51) Int. Cl.
| | | |
|---|---|---|
| *H04W 40/02* | (2009.01) | |
| *H04W 76/02* | (2009.01) | |
| *H04W 76/16* | (2018.01) | |
| *H04L 12/707* | (2013.01) | |
| *H04W 48/18* | (2009.01) | |
| *H04W 88/06* | (2009.01) | |

(52) U.S. Cl.
CPC ......... *H04W 76/026* (2013.01); *H04W 76/16* (2018.02); *H04L 45/24* (2013.01); *H04W 48/18* (2013.01); *H04W 88/06* (2013.01)

(58) Field of Classification Search
USPC ........................................................ 370/328
See application file for complete search history.

(56) References Cited

U.S. PATENT DOCUMENTS

| | | | | |
|---|---|---|---|---|
| 2006/0035682 A1* | 2/2006 | Karaoguz | ............... | H04M 3/53 455/574 |
| 2006/0079177 A1 | 4/2006 | Okubora | | |
| 2007/0091855 A1* | 4/2007 | Karaoguz | ............. | H04W 88/06 370/338 |

FOREIGN PATENT DOCUMENTS

| | | |
|---|---|---|
| JP | 2000216815 A | 8/2000 |
| JP | 2004-214726 A | 7/2004 |

* cited by examiner

*Primary Examiner* — Yemane Mesfin
*Assistant Examiner* — Jeff Banthrongsack
(74) *Attorney, Agent, or Firm* — Chip Law Group

(57) ABSTRACT

There is provided a communication control device including a communication path selecting unit that selects one or more wireless communication paths by which a wireless communication terminal performing communication using two or more wireless communication paths and a processing executing device executing processing for providing a communication service to the wireless communication terminal communicate with each other and a communication setting control unit that performs setting such that, when a plurality of wireless communication paths are selected, communication is performed between at least one processing executing device corresponding to the plurality of selected wireless communication paths and the wireless communication terminal, using the plurality of wireless communication paths.

20 Claims, 18 Drawing Sheets

FIG.3

| ACCESS POINT ID | WIRELESS COMMUNICATION METHOD | POSITION (LATITUDE, LONGITUDE) | COMMUNICATION ENABLING DISTANCE | ID OF NEIGHBORING ACCESS POINT |
|---|---|---|---|---|
| AP1 | WCDMA | (35° 40' 53.25", 139° 46' 3.49") | 10km | AP2, AP3 |
| AP2 | IEEE 802.11a | (35° 40' 46.97", 139° 46' 2.26") | 90m | AP1, AP3 |
| AP3 | IEEE 802.11g | (35° 40' 49.48", 139° 45' 57.62") | 180m | AP1, AP2 |
| AP4 | WiMAX | (35° 39' 54.76", 139° 45' 30.59") | 30km | AP6, AP8 |
| ... | ... | ... | ... | ... |

| ID OF PROCESSING EXECUTING DEVICE | ID OF CORRESPONDING ACCESS POINT |
|---|---|
| P1 | AP1、AP11、AP12、AP13 |
| P2 | AP2、AP3、AP21、AP22 |
| P3 | AP30、AP32、AP34、AP36 |
| ⋮ | ⋮ |

| SERVICE ID | SERVICE NAME | TYPE OF COMMUNICATION DATA |
|---|---|---|
| S1 | PHONE | AUDIO DATA<br>VIDEO DATA |
| S2 | VIDEO DISTRIBUTION | AUDIO DATA<br>VIDEO DATA (LOW FREQUENCY COMPONENT)<br>VIDEO DATA (HIGH FREQUENCY COMPONENT) |
| S3 | TV CONFERENCE | AUDIO DATA<br>VIDEO DATA<br>DOCUMENT DATA |
| ⋮ | ⋮ | ⋮ |

FIG.6

S2 VIDEO DISTRIBUTION

134

| SET NUMBER | NUMBER OF WIRELESS COMMUNICATION METHODS | WIRELESS COMMUNICATION METHOD | PRIORITY OF COMBINATION OF WIRELESS COMMUNICATION METHODS |
|---|---|---|---|
| 1 | 1 | WCDMA | 1. WCDMA |
| 2 | 1 | IEEE 802.11a | 2. IEEE 802.11b |
| ... | ... | ... | ... |
| k-1 | 2 | WCDMA<br>IEEE 802.11g | 1. WCDMA、IEEE 802.11g<br>2. IEEE 802.11g<br>3. WCDMA |
| k | 3 | WCDMA<br>IEEE 802.11a<br>IEEE 802.11g | 1. WCDMA、IEEE 802.11a、IEEE 802.11g<br>2. IEEE 802.11a、IEEE 802.11g<br>3. WCDMA、IEEE 802.11g<br>4. IEEE 802.11g<br>5. WCDMA、IEEE 802.11a<br>6. IEEE 802.11a<br>7. WCDMA |
| ... | ... | ... | ... |

FIG.7

S2 VIDEO DISTRIBUTION

| COMBINATION NUMBER | WIRELESS COMMUNICATION METHOD | DISTRIBUTION POLICY FOR EACH TYPE OF COMMUNICATION DATA | ID OF SETTING INFORMATION FOR WIRELESS COMMUNICATION TERMINAL | ID OF SETTING INFORMATION FOR PROCESSING EXECUTING DEVICE |
|---|---|---|---|---|
| 1 | WCDMA | AUDIO DATA : WCDMA<br>VIDEO DATA (LOW FREQUENCY COMPONENT) : WCDMA<br>VIDEO DATA (HIGH FREQUENCY COMPONENT) : WCDMA | T001_1 | P001_1 |
| ... | ... | ... | ... | ... |
| 18 | WCDMA<br>IEEE 802.11a<br>IEEE 802.11g | AUDIO DATA : WCDMA<br>VIDEO DATA (LOW FREQUENCY COMPONENT) : WCDMA<br>VIDEO DATA (HIGH FREQUENCY COMPONENT) : IEEE 802.11a, IEEE 802.11g | T001_18 | P001_18 |
| ... | ... | ... | ... | ... |

| ID OF ACCESS POINT | WIRELESS COMMUNICATION METHOD |
|---|---|
| AP1 | WCDMA |
| AP2 | IEEE 802.11a |
| AP3 | IEEE 802.11g |
| ⋮ | ⋮ |

| ID OF PROCESSING EXECUTING DEVICE | ID OF ACCESS POINT |
|---|---|
| P1 | AP1 |
| P2 | AP2, AP3 |

| ID OF WIRELESS COMMUNICATION PATH | WIRELESS COMMUNICATION METHOD | ID OF ACCESS POINT | ID OF PROCESSING EXECUTING DEVICE |
|---|---|---|---|
| C1 | WCDMA | AP1 | P1 |
| C2 | IEEE 802.11a | AP2 | P2 |
| C3 | IEEE 802.11g | AP3 | P2 |

| PRIORITY | COMBINATION OF WIRELESS COMMUNICATION PATH CANDIDATES | SETTING INFORMATION FOR WIRELESS COMMUNICATION TERMINAL | SETTING INFORMATION FOR PROCESSING EXECUTING DEVICE |
|---|---|---|---|
| 1 | C1、C2、C3 | T001_18 | P001_18 |
| 2 | C2、C3 | T001_12 | P001_12 |
| 3 | C1、C3 | T001_9 | P001_9 |
| 4 | C3 | T001_3 | P001_3 |
| 5 | C1、C2 | T001_8 | P001_8 |
| 6 | C2 | T001_2 | P001_2 |
| 7 | C1 | T001_1 | P001_1 |

158

COMMUNICATION CONTROL DEVICE PROVIDING COMMUNICATION SERVICES VIA A PLURALITY OF COMMUNICATION PATHS

CROSS-REFERENCE TO RELATED APPLICATION

The present application claims priority from Japanese Patent Application No. JP 2011-128989 filed in the Japanese Patent Office on Jun. 9, 2011, the entire content of which is incorporated herein by reference.

BACKGROUND

The present disclosure relates to a communication control device, a wireless communication terminal, a processing executing device, a communication system, and a communication control method.

Recently, as methods for causing a wireless communication terminal to receive a provided communication service through a network, the following two methods are mainly known.

A first method is a method using a concept of an "X terminal" or a "thin client" in which a processing executing device on a network is operated through a screen of a wireless communication terminal side and executes processing for providing a communication service.

A second method is a method using a concept of an "agent" in which a wireless communication terminal downloads software regarding a communication service from a communication control device on a network and executes the software.

With regard to providing the communication service using the methods through a wireless communication path, technology for selectively switching between two communication systems according to a supply situation of a power supply in a wireless communication terminal of a dual mode has been suggested, as in Japanese Laid-Open Patent Publication No. 2004-214726.

SUMMARY

However, in the methods for providing the communication system using the existing technology, it is difficult to sufficiently use resources of the wireless communication terminal. For example, according to the technology disclosed in Japanese Laid-Open Patent Publication No. 2004-214726, only one circuit is used with respect to one communication service, even when the wireless communication terminal includes a plurality of wireless circuits. In this case, a communication speed of the wireless communication path is lowered and delay is generated. For this reason, service quality of a communication service that is expected by a user may not be sufficiently achieved.

Accordingly, the present disclosure provides a communication control device, a wireless communication terminal, a processing executing device, a communication system, and a communication control method that enable resources of the wireless communication terminal to be sufficiently used when a communication service is provided.

According to an embodiment of the present disclosure, there is provided a communication control device which includes a communication path selecting unit that selects one or more wireless communication paths by which a wireless communication terminal performing communication using two or more wireless communication paths and a processing executing device executing processing for providing a communication service to the wireless communication terminal communicate with each other and a communication setting control unit that performs setting such that, when a plurality of wireless communication paths are selected, communication is performed between at least one processing executing device corresponding to the plurality of selected wireless communication paths and the wireless communication terminal, using the plurality of wireless communication paths.

According to another embodiment of the present disclosure, there is provided a wireless communication terminal which includes a communication unit that performs communication using two or more wireless communication paths and a communication setting unit that performs setting to communicate with at least one processing executing device using a plurality of wireless communication paths, when an instruction to request that setting to communicate with at least one processing executing device corresponding to the plurality of wireless communication paths using the plurality of wireless communication paths be performed is received from a communication control device selecting one or more wireless communication paths to communicate with the processing executing device executing processing for providing a communication service.

According to another embodiment of the present disclosure, there is provided a processing executing device which includes a processing executing unit that executes processing for providing a communication service to a wireless communication terminal performing communication using two or more wireless communication paths, a communication unit that communicates with a communication control device selecting one or more wireless communication paths to communicate with the wireless communication terminal, and a communication setting unit that performs setting to communicate with the wireless communication terminal using at least one wireless communication path, when an instruction to request that setting to communicate with the wireless communication terminal using at least one wireless communication path corresponding to a self device among the plurality of wireless communication paths selected by the communication control device be performed is received from the communication control device.

According to another embodiment of the present disclosure, there is provided a communication system which includes a wireless communication terminal that performs communication using two or more wireless communication paths, one or more processing executing devices that execute processing for providing a communication service to the wireless communication terminal and a communication control device that selects one or more wireless communication paths by which the wireless communication terminal and the processing executing devices communicate with each other. When the communication control device selects a plurality of wireless communication paths, at least one processing executing device corresponding to the plurality of selected wireless communication paths and the wireless communication terminal are set to communicate with each other using the plurality of wireless communication paths.

According to another embodiment of the present disclosure, there is provided a communication control method for a communication control device which controls communication of a wireless communication terminal performing communication using two or more wireless communication paths and a processing executing device executing processing for providing a communication service to the wireless communication terminal. The communication control method includes selecting one or more wireless communication paths by which the wireless communication terminal and the processing executing device communicate with each other and performing setting such that, when a plurality of wireless communication paths are selected, communication is performed between at least one processing executing device corresponding to the plurality of selected wireless communication paths and the wireless communication terminal, using the plurality of wireless communication paths.

According to the embodiments of the present disclosure described above, resources of the wireless communication terminal can be sufficiently used when a communication service is provided.

BRIEF DESCRIPTION OF THE DRAWINGS

FIG. 3 is a diagram illustrating an example of an access point table that is stored in an access point DB;

FIG. 4 is a diagram illustrating an example of a processing executing device table that is stored in a processing executing device DB;

FIG. 5 is a diagram illustrating an example of a communication service table that is stored in a communication service DB;

FIG. 6 is a diagram illustrating an example of a priority table that is stored in the communication service DB;

FIG. 7 is a diagram illustrating an example of a setting table that is stored in the communication service DB;

FIG. 12 is a diagram illustrating an example of an access point list made at the time of setting the wireless communication path;

FIG. 13 is a diagram illustrating an example of a processing executing device list made at the time of setting the wireless communication path;

FIG. 14 is a diagram illustrating an example of a wireless communication path list made at the time of setting the wireless communication path;

FIG. 15 is a diagram illustrating an example of a wireless communication path selection table made at the time of setting the wireless communication path;

DETAILED DESCRIPTION OF THE EMBODIMENT(S)

Figure 1:
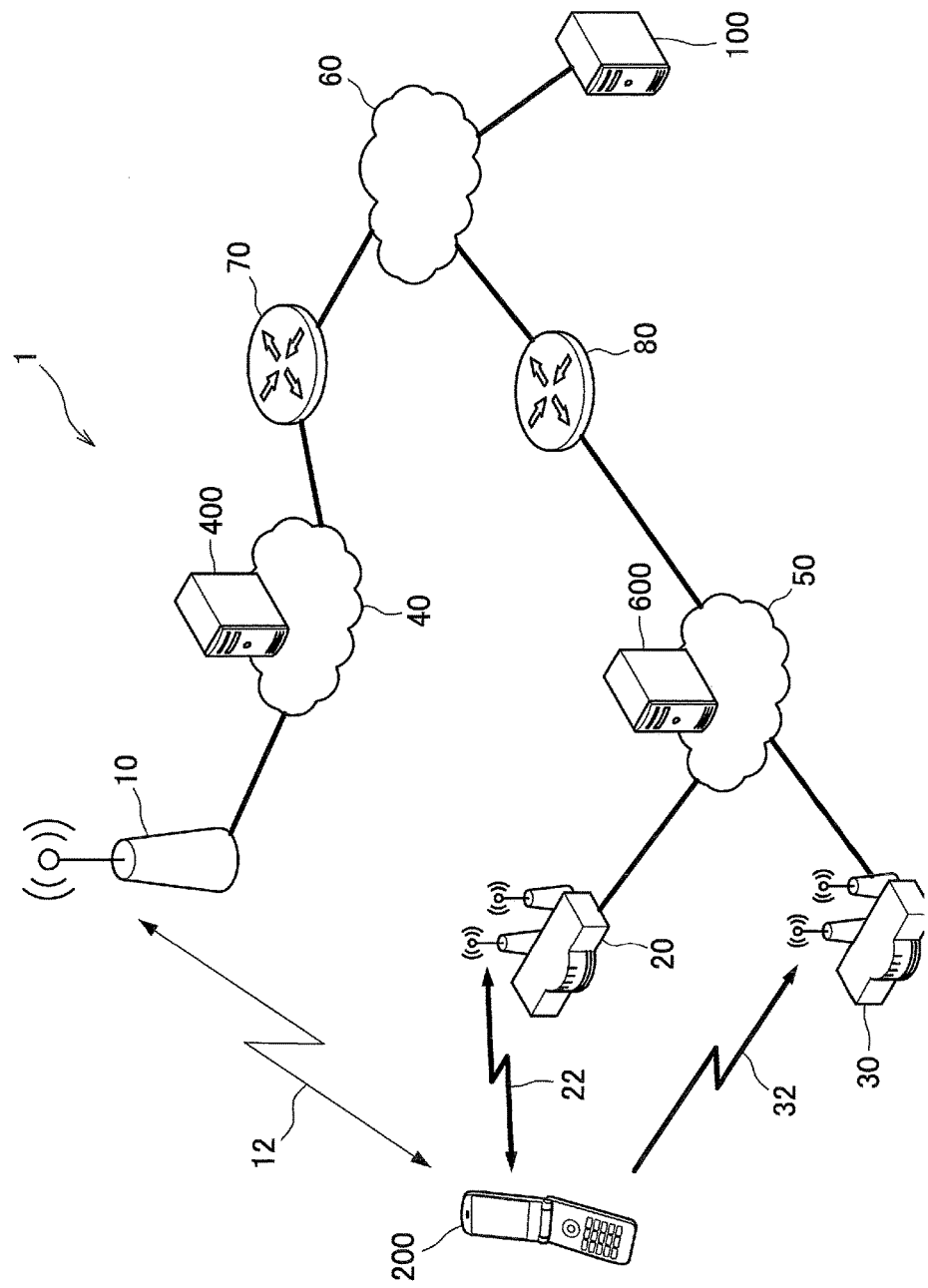
FIG. 1 is a diagram illustrating an example of a configuration of a communication system according to an embodiment of the present disclosure.

Hereinafter, preferred embodiments of the present disclosure will be described in detail with reference to the appended drawings. Note that, in the present disclosure and the appended drawings, structural elements that have substantially the same function and structure are denoted with the same reference numerals, and repeated explanation of these structural elements is omitted.

The following description will be made in the order described below.

1. Configuration of Communication System according to Embodiment
2. Configuration of Each Device
  2.1. Configuration of Communication Control Device
  2.2. Configuration of Wireless Communication Terminal
  2.3 Configuration of Processing Executing Device
3. Flow of Processing
  3.1. Flow of Processing at the time of setting Wireless Communication Path
  3.2. Flow of Processing after setting Wireless Communication Path
4. Conclusion <1. Configuration of Communication System according to Embodiment>

First, a configuration of a communication system 1 according to an embodiment of the present disclosure will be described with reference to FIG. 1. FIG. 1 is a diagram illustrating an example of the configuration of the communication system 1 according to the embodiment.

As illustrated in FIG. 1, the communication system includes a communication control device 100, a wireless communication terminal 200, processing executing devices 400 and 600, access points 10, 20, and 30, wireless communication paths 11, 22, and 32, networks 40, 50, and 60, and routers 70 and 80.

The wireless communication terminal 200 is a terminal that can perform communication using two or more wireless communication paths. For example, the wireless communication terminal 200 may be a mobile phone terminal, a personal computer, a portable information terminal, a navigation terminal, or a game terminal. In the present disclosure, the wireless communication path refers to a communication path by which a wireless communication terminal receiving a provided communication service performs wireless communication with the access point to be described below. In each wireless communication path, communication is performed using any wireless communication method. The wireless communication method may be a cellular system such as a global system for mobile communications (GSM), wide-band code division multiple access (WCDMA), worldwide interoperability for microwave access (WiMax), long terminal evolution (LTE), and a personal handy-phone system (PHS), a wireless LAN system such as IEEE802.11a/b/g/n, or any other communication method. For example, the wireless communication terminal 200 supports WCDMA, IEEE802.11a, and IEEE802.11g and can perform communication using a wireless communication path of WCDMA, a wireless communication path of IEEE802.11a, and a wireless communication path of IEEE802.11g. The wireless communication path that is used by the wireless communication terminal 200 may include a plurality of wireless communication paths of the same wireless communication method. For example, the wireless communication terminal 200 may have two or more wireless communication circuits that support WCDMA and may perform communication using two or more wireless communication paths of WCDMA.

The wireless communication terminal 200 requests the communication control device 100 to provide a communication service and receives an instruction regarding setting of the wireless communication path from the communication control device 100. According to the instruction, the wireless communication terminal 200 sets a self device to communicate with the processing executing devices 400 and 600 using the wireless communication paths 12, 22, and 32. The communication service may be a service such as video distribution, a video conference, a telephone conversation, and an online game to be provided to the wireless communication terminal 200 through a network.

The access points 10, 20, and 30 are devices that perform wireless communication with the wireless communication terminal 200 and relay communication between the wireless communication terminal 200 and the processing executing devices. The access points 10, 20, and 30 support given wireless communication methods and communicate with the wireless communication terminal 200 using the wireless communication paths of the wireless communication methods. In the present disclosure, the access points include access points of the wireless LAN system and any given devices to which the wireless communication terminal has direct access using a radio signal to receive a provided communication service, such as base stations of a cellular system. For example, the access points 10, 20, and 30 may be a base station of WCDMA, a wireless LAN access point of IEEE802.11a, and a wireless LAN access point of IEEE802.11g, respectively. For this reason, the access points 10, 20, and 30 can be connected to the wireless communication terminal 100.

The wireless communication paths 12, 22, and 32 are communication paths by which the wireless communication terminal 200 and the access points 10, 20, and 30 perform wireless communication. For example, the wireless communication paths 12, 22, and 32 may be a wireless communication path of WCDMA, a wireless communication path of IEEE802.11a, and a wireless communication path of IEEE802.11g, respectively.

The processing executing devices 400 and 600 are devices that can execute processing for providing a communication service to the wireless communication terminal 200. For example, the processing executing devices 400 and 600 may be server devices that are provided on a network of the Internet or a communications carrier. The processing executing device 400 corresponds to the wireless communication path 12 and the access point 10 and the processing executing device 600 corresponds to the wireless communication path 22 and the access point 20 and the wireless communication path 32 and the access point 30. If the processing executing device 400 receives the instruction regarding the setting of the wireless communication path, the processing executing device 400 sets a self device to communicate with the wireless communication terminal 200 using the wireless communication path 12, according to the instruction. Likewise, if the processing executing device 600 receives the instruction regarding the setting of the wireless communication path, the processing executing device 600 sets a self device to communicate with the wireless communication terminal 200 using the wireless communication paths 22 and 32, according to the instruction.

The communication control device 100 is a device that controls communication with the wireless communication terminal 200 and the processing executing device. For example, the communication control device 100 may be a server device that is provided on the network of the Internet or the communications carrier. The communication control device 100 receives a request of a communication service from the wireless communication terminal 200 and selects one or more wireless communication paths by which the wireless communication terminal 200 and one or more processing executing devices communicate with each other. For example, the communication control device 100 selects the wireless communication paths 12, 22, and 32. The communication control device 100 performs setting such that communication is performed between the processing executing device 400 corresponding to the wireless communication path 12 and the processing executing device 600 corresponding to the wireless communication paths 22 and 32 and the wireless communication terminal 200 using the wireless communication paths 12, 22, and 32.

The network 40 is a network to which the access point 10 and the processing executing device 400 are connected. The network 50 is a network to which the access points 20 and 30 and the processing executing device 600 are connected. The network 60 is a network to which the communication control device 100 is connected.

The router 70 is a relay device that relays packets between the network 40 and the network 60. The router 80 is a relay device that relays packets between the network 50 and the network 60.

In the related art, even though the wireless communication terminal 200 can perform communication using the two or more wireless communication paths (for example, wireless communication paths 12, 22, and 32), the wireless communication terminal 200 performs communication using one wireless communication path when a communication service is provided. For this reason, if data not transmitted using only one wireless communication path is generated in the communication service, a communication service that has quality expected by a user is not provided. For example, in a communication service of a video conference, the wireless communication terminal 200 may not receive video data and minimum audio data in real time. As a result, the processing executing devices 400 and 600 do not substantially provide the communication service of the video conference. For example, in a communication service of video distribution, the wireless communication terminal 200 can receive audio data and minimum video data. However, the wireless communication terminal 200 may not receive high-definition video data. As a result, the processing executing devices 400 and 600 provide a video distribution service with low service quality to the user. As described above, resources of the wireless communication terminal 200 are not sufficiently used and a communication service with high satisfaction may not be provided to the user. In the embodiment, because the wireless communication terminal 200 communicate with one or more processing executing devices using the plurality of wireless communication paths as described above, a communication service with high quality can be realized when the communication service is provided.

<2. Configuration of Each Device>
[2.1 Configuration of Communication Control Device]

Figure 2:
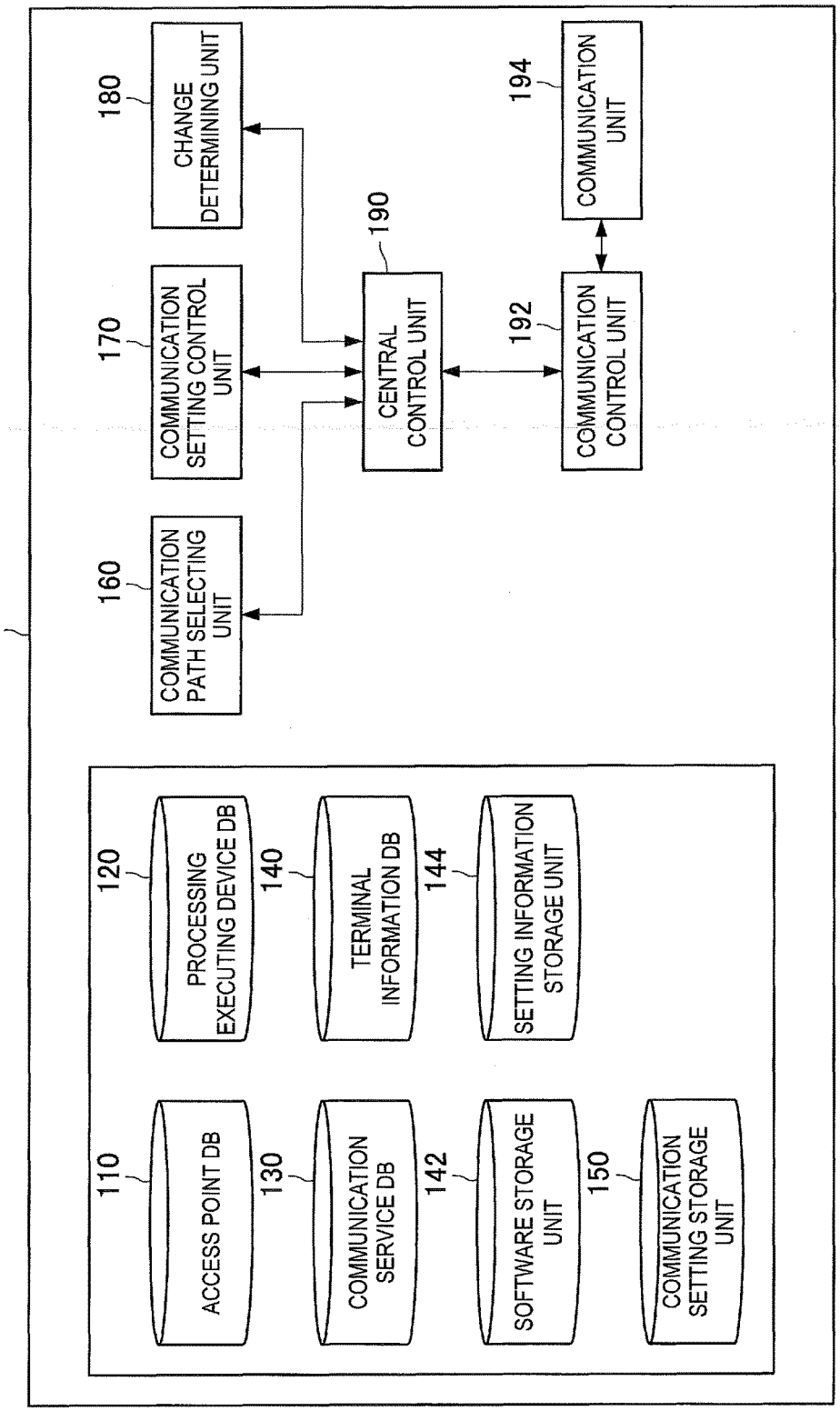
FIG. 2 is a block diagram illustrating an example of a configuration of a communication control device according to the embodiment.

A specific configuration of the communication control device 100 according to the embodiment will be described using FIGS. 2 to 7. Referring to FIG. 2, the communication control device 100 includes an access point database 110 (hereinafter, "databases" are referred to as "DBs"), a processing executing device DB 120, a communication service DB 130, a terminal information DB 140, a software storage unit 142, a setting information storage unit 144, a communication setting storage unit 150, a communication path selecting unit 160, a communication setting control unit 170, a change determining unit 180, a central control unit 190, a communication control unit 192, and a communication unit 194.

(Access Point DB 110)

The access point DB 110 stores IDs of access points arranged at various places and information regarding the access points. FIG. 3 is a diagram illustrating an example of an access point table 112 that is stored in the access point DB 110. Referring to FIG. 3, an identifier (ID) of each access point, a wireless communication method of each access point, an arrangement position (latitude and longitude) of each access point, a communication enabling distance of each access point, and IDs of other access points positioned near each access point are stored in the access point table 112. The access points that are positioned near each access point are other access points to which the wireless communication terminal may be connected, when the wireless communication terminal is arranged at a connection position with each access point.

(Processing Executing Device DB 120)

The processing executing device DB 120 stores IDs of the processing executing devices arranged at the various positions on the network and information regarding the processing executing devices. FIG. 4 is a diagram illustrating an example of a processing executing device table 122 that is stored in the processing executing device DB 120. Referring to FIG. 4, an ID of each processing executing device and IDs of access points corresponding to each processing executing device are stored in the processing executing device table 122. The access points that correspond to each processing executing device are access points that exist on the network at positions closest to the processing executing device. For example, because the processing executing device existing at the position closest to the access points AP2 and AP3 is the processing executing device P2, IDs of the access points AP2 and AP3 are included in IDs of the access points corresponding to the processing executing device P2, in FIG. 4. In the present disclosure, one processing executing device corresponds to one access point. However, the present disclosure is not limited to the above example and a plurality of processing executing devices may correspond to one access point.

(Communication Service DB 130)

The communication service DB 130 stores a service ID of a communication service and information regarding the communication service. FIG. 5 is a diagram illustrating an example of a communication service table 132 that is stored in the communication service DB 130. Referring to FIG. 5, a service ID of each communication service, a communication service name, and a type of communication data are stored in the communication service table 132. For example, examples of the type of communication data in the video distribution include audio data, video data of a low frequency component, and video data of a high frequency component. In this case, the low frequency component and the high frequency component may be a low frequency component and a high frequency component of video data that is divided by a wavelet transform, respectively.

FIG. 6 is a diagram illustrating an example of a priority table 134 that is stored in the communication service DB 130. The priority table 134 is made for each communication service. Referring to FIG. 6, information regarding sets of wireless communication methods including one or more wireless communication methods is stored in the priority table 134 of each communication service. Specifically, a set number to identify each set, the number of wireless communication methods included in each set, the wireless communication methods included in each set, and priority of each combination of the wireless communication methods included in each set are stored. FIG. 6 illustrates an example of video distribution in which a service ID is S2. The priority table 134 is used when the communication path selecting unit 160 to be described below selects a combination of wireless communication paths.

FIG. 7 is a diagram illustrating an example of a setting table 136 that is stored in the communication service DB 130. The setting table 136 is made for each communication service. Referring to FIG. 7, information regarding each combination of one or more wireless communication methods is stored in the setting table 136 of each communication service. Specifically, a combination number to identify each combination, wireless communication methods included in each combination, and a distribution policy for each type of communication data in the case of using wireless communication paths of the wireless communication methods included in each combination are stored. In addition, an ID of software setting information for the wireless communication terminal and an ID of software setting information for the processing executing device to perform communication using the wireless communication paths of the wireless communication methods included in each combination are stored. FIG. 7 illustrates an example of a video distribution in which a service ID is S2. The setting table 136 is used when the communication setting control unit 170 to be described below specifies the software setting information for the wireless communication terminal and the software setting information for the processing executing device.

In the set of the wireless communication paths in the priority table 134 and the combination of the wireless communication paths in the setting table 136, a combination of two or more equal wireless communication methods may be included. For example, a set or a combination of wireless communication methods of (WCDMA1 and WCDMA2) may be defined on the assumption that there is a wireless communication terminal having a plurality of wireless communication circuits that can perform communication using WCDMA.

(Terminal Information DB 140)

The terminal information DB 140 stores an ID of the wireless communication terminal and information regarding the wireless communication terminal. For example, the terminal information DB 140 stores information to identify a combination of wireless communication methods supported by each wireless communication terminal. The information may be stored previously in the terminal information DB 140 or may be received according to a request of a communication service from each wireless communication terminal.

(Software Storage Unit 142)

The software storage unit 142 stores software that is necessary for providing a communication service to the wireless communication terminal. The stored software may include software for the processing executing device that is executed by the processing executing device to provide a communication service. The stored software may include software for the wireless communication terminal that is executed by the wireless communication terminal with respect to the communication service. The stored software may include a device driver for the wireless communication terminal or a device driver for the processing executing device to perform communication using the plurality of wireless communication paths selected by the communication path setting unit 160 to be described below.

(Setting Information Storage Unit 144)

The setting information storage unit 144 stores software setting information for the wireless communication terminal and software setting information of the processing executing device to perform communication using the wireless communication paths selected by the communication path selecting unit 160 to be described below. The software setting information for the wireless communication terminal and the software setting information for the process executing device are generated for each combination of the wireless communication methods with respect to each communication service. All of the software setting information is associated with an "ID of setting information for the wireless communication terminal" or an "ID of setting information for the processing executing device" in the setting table 136 illustrated in FIG. 7. The software setting information is setting information to set at least one of application software, an operating system, and a device driver.

(Communication Setting Storage Unit 150)

The communication setting storage unit 150 stores a list and a table that are made to select the wireless communication paths by the communication path selecting unit 160 to be described below. For example, the communication setting storage unit 150 stores an access point list 152, a processing executing device list 154, a wireless communication path list 156, and a wireless communication path selection table 158 illustrated in FIGS. 12 to 15 to be described in detail below, respectively.

(Communication Path Selecting Unit 160)

The communication path selecting unit 160 selects one or more wireless communication paths by which the wireless communication terminal performing communication using two or more wireless communication paths and the processing executing device executing processing for providing the communication service to the wireless communication terminal communicate with each other. When the communication path selecting unit 160 receives a request of a communication service from the wireless communication terminal 200, the communication path selecting unit 160 selects one or more wireless communication paths according to the request.

Specifically, the communication path selecting unit 160 selects one or more access point candidates connected to the wireless communication terminal 200 and selects one or more wireless communication paths from one or more wireless communication path candidates between one or more access point candidates and the wireless communication terminal 200. The communication path selecting unit 160 selects access points corresponding to the wireless communication methods supported by the wireless communication terminal 200 and arranged at connection positions with the wireless communication terminal 200 among the access points stored in the access point table 112 as the access point candidates. First, a method of specifying the access points corresponding to the wireless communication methods supported by the wireless communication terminal 200 will be described. The communication path selecting unit 160 acquires an ID of the wireless communication terminal 200 received according to a request of a communication service from the wireless communication terminal 200. The communication path selecting unit 160 searches the terminal information DB 140 using the ID of the wireless communication terminal 200 and specifies the wireless communication methods supported by the wireless communication terminal 200. The communication path selecting unit 160 specifies an access point corresponding to any one of the specified wireless communication method systems, from the access point table 112. Next, a method of specifying the access points arranged at the connection positions with the wireless communication terminal 200 will be described. The communication path selecting unit 160 can specify the access points arranged at the connection positions with the wireless communication terminal 200, from the information regarding the position of the wireless communication terminal 200 received according to the request of the communication service and the information stored in the access point table 112. In this case, the information regarding the position may be the ID of the access point recently connected by the wireless communication terminal 200 or information indicating the position of the wireless communication terminal 200 such as the latitude and the longitude. For example, if the information regarding the position is the ID of the access point recently connected by the wireless communication terminal 200, the communication path selecting unit 160 searches an attribute of an "ID of a neighboring access point" of the access point table 112 using the ID. Thereby, the communication path selecting unit 160 can specify the access point arranged at the connection position with the wireless communication terminal 200. For example, if the information regarding the position is the latitude and the longitude of the wireless communication terminal 200, the communication path selecting unit 160 calculates the distance between the wireless communication terminal 200 and the access point, from the latitude and the longitude and an attribute of a "position (latitude and longitude)" of the access point table 112. If the communication path selecting unit 160 compares the calculated distance and an attribute of a "communication enabling distance" of the access point table 112, the communication path selecting unit 160 can specify the access point arranged at the connection position with the wireless communication terminal 200. The communication path selecting unit 160 makes an access point list 152 illustrated in FIG. 12 to be described below, with respect to the access point candidates. The communication path selecting unit 160 makes a wireless communication path list 156 illustrated in FIG. 14 to be described below, with respect to the communication path candidates. By selecting the access point candidates, the access points to which the wireless communication terminal 200 can be connected can be specified in full detail. As a result, the wireless communication paths can be selected from the plurality of wireless communication path candidates that can be used by the wireless communication terminal 200.

The communication path selecting unit 160 selects the wireless communication paths included in the combination of the wireless communication path candidates having the high priority among given combinations of one or more wireless communication path candidates as one or more wireless communication paths to be used to provide the communication service. In this case, the priority is priority of a combination of the wireless communication methods corresponding to the wireless communication path candidates included in each combination of the wireless communication path candidates. Specifically, the communication path selecting unit 160 specifies the wireless communication method corresponding to each wireless communication path candidate from an attribute of a "wireless communication method" of the access point table 112 and obtains a set of the wireless communication methods including the specified wireless communication method. The communication path selecting unit 160 acquires the service ID of the communication service received according to the request of the communication service from the wireless communication terminal 200. The communication path selecting unit 160 specifies the priority of each combination of the wireless communication methods of the set of the wireless communication methods from the priority table 134 on the basis of the set of the specified wireless communication methods and the acquired service ID of the communication service. As illustrated in FIG. 6, the priority of each combination of the wireless communication methods is determined previously for each communication service. FIG. 6 illustrates an example of video distribution. For example, in the video distribution, the acquired service ID of the communication service is S2 and a set of the wireless communication methods corresponding to the three wireless communication path candidates includes WCDMA, IEEE802.11a, and IEEE802.11g. The combinations of the wireless communication methods include combinations of all of the three wireless communication methods, any of the two wireless communication methods, and any one of the wireless communication methods. Referring to FIG. 6, the set of the wireless communication methods corresponds to a set number k. In the set number k, a combination of "1. WCDMA, IEEE802.11a, and IEEE802.11g" among the combinations of the wireless communication methods becomes a combination that has the highest priority. Therefore, the communication path selecting unit 160 selects the combination of all of the three wireless communication path candidates as the wireless communication paths. The communication path selecting unit 160 makes a wireless communication path selection table 158 illustrated in FIG. 15 to be described below, with respect to each combination of the wireless communication path candidates and the priority of each combination. By selecting the wireless communication path according to the priority, the wireless communication terminal 200 can perform communication using an optimal combination of the wireless communication paths for the communication service. As a result, service quality of the communication service can be improved. For example, in a communication service in which a service provision speed is important, a combination of the wireless communication path candidates in which a sum of the communication speeds of the wireless communication path candidates is maximized is selected as the wireless communication paths. As a result, the possibility of realizing service quality of the communication service becomes high. For example, in a communication service that is provided continuously for a long time, a combination of the wireless communication path candidates in which consumption power decreases while a sum of the communication speeds of the wireless communication path candidates satisfies a minimum request is selected as the wireless communication paths. As a result, the communication service can be provided continuously for a long time, using a power supply having a limited power amount.

The communication path selecting unit 160 may select one or more wireless communication paths from the wireless communication path candidates satisfying predetermined communication quality among one or more wireless communication path candidates. When the set of the wireless communication methods is WCDMA, IEEE802.11a, and IEEE802.11g, the wireless communication path of IEEE802.11g may not satisfy the predetermined communication quality. In this case, as illustrated in FIG. 6, a combination of "5. WCDMA and IEEE802.11a" that does not include IEEE802.11g becomes a combination that has the highest priority. As a result, the communication path selecting unit 160 selects the wireless communication path candidate of WCDMA and the wireless communication path candidate of IEEE802.11a as the wireless communication paths to be used to provide a communication service. The communication path selecting unit 160 transmits a connection confirmation instruction to the wireless communication terminal 200 and the processing executing device to obtain the measurement result of the communication quality. As such, the wireless communication paths are selected from only the wireless communication path candidates satisfying the predetermined communication quality, such that the communication data can be prevented from being distributed to the wireless communication paths not satisfying the predetermined communication quality. As a result, a risk of reception of data of a certain type distributed to the wireless communication path having the low communication quality becoming difficult can be decreased.

According to the table illustrated in FIG. 6, the communication path selecting unit 160 selects all of the wireless communication path candidates satisfying the predetermined communication quality as the wireless communication paths. As such, if all of the wireless communication path candidates are selected as the wireless communication paths, the service provision speed can be maximized.

The communication path selecting unit 160 selects the processing executing device that communicates with the wireless communication terminal 200 using each wireless communication path candidate. Specifically, the communication path selecting unit 160 specifies the ID of the processing executing device included in the "IDs of the corresponding access points" from the processing executing device table 122 illustrated in FIG. 4. The processing executing device becomes a processing executing device that communicates with the wireless communication terminal 200 using the wireless communication paths corresponding to the access point candidates. The communication path selecting unit 160 makes a processing executing device list 154 illustrated in FIG. 13 to be described below, with respect to the processing executing device. The processing executing device that provides the communication service is determined according to selection of the wireless communication path.

When it is determined that a part of or all of the set wireless communication paths should be changed, the communication path selecting unit 160 executes selection processing for selecting one or more wireless communication paths again. When the wireless communication terminal 200 or the processing executing device provides the processing result indicating that a part of or all of the set wireless communication paths should be changed, the communication path selecting unit 160 executes the selection processing again. When the determination result is provided by the change determining unit 180 to be described below, the communication path selecting unit 160 may execute the selection processing again. As such, if the wireless communication paths are reselected, communication can be performed again using an optimal combination of the wireless communication paths, even when a communication environment of the wireless communication terminal 200 changes.

(Communication Setting Control Unit 170)

The communication setting control unit 170 performs setting such that communication is performed between the processing executing device corresponding to the wireless communication path and the wireless communication terminal 200 using the wireless communication path selected by the communication path selecting unit 160. Particularly, in the embodiment, when a plurality of wireless communication paths are selected, the communication setting control unit 170 performs setting such that communication is performed between at least one processing executing device corresponding to the plurality of selected wireless communication paths and the wireless communication terminal 200. In the following description, it is assumed that at least one processing executing device is determined as the processing executing devices 400 and 600.

Specifically, the communication setting control unit 170 provides the software setting information for the wireless communication terminal to perform communication using the plurality of wireless communication paths to the wireless communication terminal 200. For example, the communication setting control unit 170 provides the software setting information for the processing executing device to perform communication using the plurality of wireless communication paths to the processing executing devices 400 and 600. The communication setting control unit 170 acquires the service ID of the communication service received according to the request of the communication service from the wireless communication terminal 200. The communication setting control unit 170 specifies the ID of the software setting information for the wireless communication terminal and the ID of the software setting information for the processing executing device, from the setting table 136, on the basis of the service ID and the combination of the wireless communication methods corresponding to the plurality of wireless communication paths. Referring to FIG. 7, if the service ID is S2 in the video distribution and the combination of the wireless communication methods is WCDMA, IEEE802.11a, and IEEE802.11g, the ID of the software setting information for the wireless communication terminal is T001_18. The ID of the software setting information for the processing executing device is P001_18. The communication setting control unit 170 acquires the software setting information for the wireless communication terminal and the software setting information for the processing executing device from the setting information storage unit 144 on the basis of the ID of the software setting information for the wireless communication terminal and the ID of the software setting information for the processing executing device. As such, if the software setting information is provided, the wireless communication terminal 200 and the processing executing devices 400 and 600 can acquire the software setting information according to necessity, even when the wireless communication terminal 200 and the processing executing devices 400 and 600 do not previously have the software setting information for each combination of the wireless communication methods with respect to each communication service. When the wireless communication terminal 200 and the processing executing devices 400 and 600 previously have the software setting information, the communication setting control unit 170 may not provide the software setting information for the wireless communication terminal or the software setting information for the processing executing device. In this case, the communication setting control unit 170 may provide only the ID of the software setting information for the wireless communication terminal or the ID of the software setting information for the processing executing device. The communication setting control unit 170 may provide previously set software, instead of the software setting information.

The communication setting control unit 170 sets a range of data transmitted using each of the plurality of wireless communication paths among data regarding a communication service transmitted using the plurality of wireless communication paths to the wireless communication terminal 200. The range of the data is determined previously according to the communication service. Specifically, the communication setting control unit 170 provides the software setting information for the wireless communication terminal set as described above to the wireless communication terminal 200. Referring to FIG. 7, in the setting table 136, a distribution policy for each type of communication data is determined for each combination of the communication methods with respect to each communication service. In the setting table 136, the ID of the software setting information for the wireless communication terminal corresponding to the distribution policy is stored. Referring to FIG. 7, a distribution policy for each type of communication data with respect to a combination of the wireless communication methods of "WCDMA, IEEE802.11a, and IEEE802.11g" denoted with a number 18 is illustrated. According to the policy, the audio data and the video data of the low frequency component are transmitted using the wireless communication path of WCDMA. The video data of the high frequency component is transmitted using the wireless communication path of IEEE802.11a and the wireless communication path of IEEE802.11g. By distributing the communication data, the wireless communication terminal 200 can continuously receive minimum data necessary for providing the communication service, using the wireless communication path of WCDMA in which communication can be continuously performed, even when the wireless communication terminal 200 moves. The wireless communication terminal 200 can receive data having the large capacity, using a wireless LAN only when the wireless communication terminal 200 can be connected to the wireless LAN. Thereby, even when the wireless communication terminal 200 moves, acceptable minimum service quality for a user can be secured. As such, communication according to a use form or a characteristic of a communication service can be realized by setting the type of data transmitted using each of the wireless communication paths. As a result, service quality for the user can be improved.

The communication setting control unit 170 provides the software for the processing executing device executed by the processing executing device to provide a communication service to the processing executing devices 400 and 600. The communication setting control unit 170 provides the software for the wireless communication terminal executed by the wireless communication terminal 200 with respect to the communication service to the wireless communication terminal 200. The communication setting control unit 170 may provide the device driver for the wireless communication terminal or the device driver for the processing executing device to perform communication using the plurality of selected wireless communication paths to the wireless communication terminal 200 or the processing executing device 400 or 600. The software is acquired from the software storage unit 142 using the service ID of the communication service. As such, if the software is provided, the wireless communication terminal 200 and the processing executing devices 400 and 600 can acquire the software according to necessity, even when the wireless communication terminal 200 and the processing executing devices 400 and 600 do not previously have the software with respect to each communication service.

When it is determined that a part of or all of the set wireless communication paths should be changed, the communication setting control unit 170 executes setting control processing for performing setting such that communication is performed using one or more wireless communication paths reselected by the communication path selecting unit 160. When the wireless communication terminal 200 or the processing executing device 400 or 600 provides the determination result indicating that a part of or all of the set wireless communication paths should be changed, the communication setting control unit 170 executes the setting control processing. When the determination result is provided by the change determining unit 180 to be described below, the communication setting control unit 170 may execute the setting control processing. As such, if the communication setting is performed again, communication can be performed again using an optimal combination of the wireless communication paths, even when a communication environment of the wireless communication terminal 200 changes.

(Change Determining Unit 180)

The change determining unit 180 determines whether a part of or all of the set wireless communication paths should be changed on the basis of the measurement result of the communication quality of the set wireless communication paths. For example, the measurement result of the communication quality of the wireless communication paths is provided from the wireless communication terminal 200 or the processing executing devices 400 and 600. The change determining unit 180 determines whether each of the set wireless communication paths satisfies the predetermined communication quality. When any one of the set wireless communication paths does not satisfy the predetermined communication quality, the change determining unit 180 determines that the wireless communication path should be changed. The change determining unit 180 may determine whether the previously made wireless communication path selection table 158 should be changed on the basis of a movement situation of the wireless communication terminal 200 at the time of the previous communication setting. By performing the determination at the side of the communication control device 100, the wireless communication paths can be set again with respect to the wireless communication terminal 200 or the processing executing devices 400 and 600 that have or do not have a determination reference or a determination function. Meanwhile, the wireless communication terminal 200 or the processing executing devices 400 and 600 may perform the determination. By performing the determination with the wireless communication terminal 200 or the processing executing devices 400 and 600, it becomes unnecessary to transmit the measurement result to the communication control device 100 each time the communication quality is measured. As a result, traffic between the communication control device 100 and each device can be decreased. The processing can be prevented from being concentrated on the communication control device 100.

The change determining unit 180 may determine whether the wireless communication path candidates satisfy the predetermined communication quality on the basis of the measurement result of the communication quality of the wireless communication path candidates, and provide the determination result of each wireless communication path candidate to the communication path selecting unit 160. The wireless communication terminal 200 or the processing executing devices 400 and 600 may perform the determination.

(Central Control Unit 190)

The central control unit 190 controls the entire communication control device 100. For example, the central control unit 190 provides reception data received through the communication unit 194 to the communication path selecting unit 160, the communication setting control unit 170, the change determining unit 180, each DB, or a storage unit. The central control unit 190 receives a request from the communication path selecting unit 160, the communication setting control unit 170, or the change control unit 180 and requests the communication control unit 192 to transmit data. The central control unit 190 receives the request from the communication path selecting unit 160, the communication setting control unit 170, or the change determining unit 180 and provides information stored in each DB and the storage unit or stores information in each DB and the storage unit.

(Communication Control Unit 192 and Communication Unit 194)

The communication control unit 192 controls communication by the communication control device 100. The communication control unit 192 generates transmission packets with respect to the transmission data and transmits the transmission packets through the communication unit 194. The communication control unit 192 acquires the reception data from the reception packets received by the communication unit 194. The communication unit 194 transmits and receives the packets through the network.

[2.2 Configuration of Wireless Communication Terminal]

Figure 8:
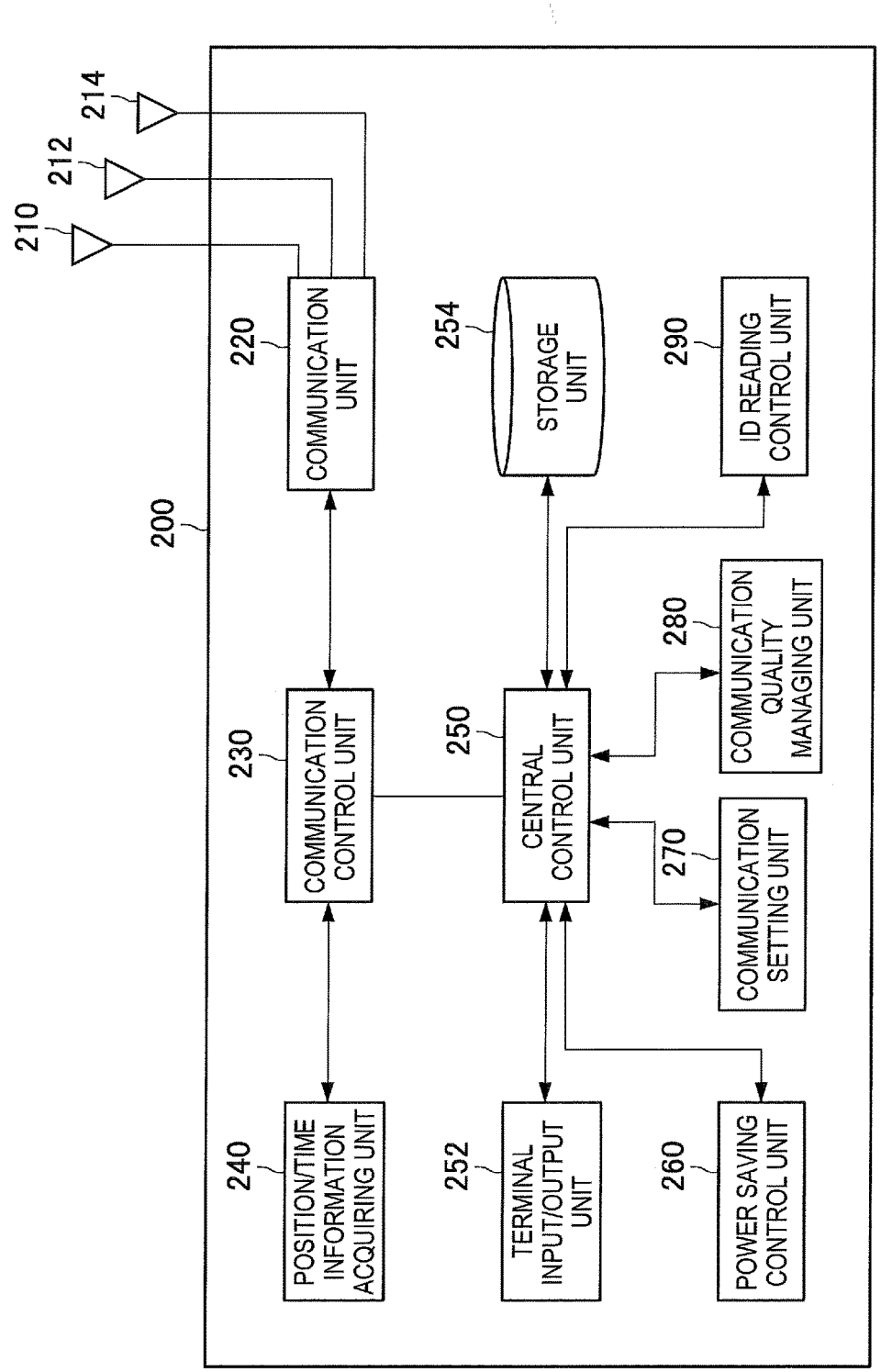
FIG. 8 is a block diagram illustrating an example of a configuration of a wireless communication terminal according to the embodiment of the present disclosure.

A specific configuration of the wireless communication terminal 200 according to the embodiment will be described using FIG. 8. Referring to FIG. 8, the wireless communication terminal 200 includes antennas 210, 212, and 214, a communication unit 220, a communication control unit 230, a position/time information acquiring unit 240, a central control unit 250, a terminal input/output unit 252, a storage unit 254, a power saving control unit 260, a communication setting unit 270, a communication quality managing unit 280, and an ID reading control unit 290.

(Antennas 210, 212, and 214)

The antennas 210, 212, and 214 transmit and receive a radio wave of the wireless communication path. For example, the antenna 210 transmits and receives a radio wave of the wireless communication path of WCDMA. The antenna 212 transmits and receives a radio wave of the wireless communication path of IEEE802.11a. The antenna 214 transmits and receives a radio wave of the wireless communication path of IEEE802.11g. The number of antennas is not limited to three and the antennas may be provided according to the number of wireless communication methods in which the wireless communication terminal 200 can perform communication. When the antennas can be shared between the wireless communication methods, the number of antennas may be smaller than the number of wireless communication methods in which the wireless communication terminal 200 can perform communication.

(Communication Unit 220)

The communication unit 220 can perform communication using two or more wireless communication paths. The communication unit 220 performs communication using the wireless communication path of WCDMA through the antenna 210. Likewise, the communication unit 220 performs communication using the wireless communication path of IEEE802.11a through the antenna 212 and performs communication using the wireless communication path of IEEE802.11g through the antenna 214. The communication unit 220 may have a different communication circuit for each wireless communication method and the communication circuit may be partially shared. The communication unit 220 may have a plurality of communication circuits supporting the same wireless communication method and corresponding antennas. Thereby, wireless communication using two or more wireless communication paths can be performed. The communication unit 220 provides the reception packets received using each wireless communication path to the communication control unit 230. The communication unit 220 transmits each transmission packet with respect to the transmission data using the wireless communication path corresponding to each transmission packet on the basis of control by the communication control unit 230.

(Communication Control Unit 230)

The communication control unit 230 controls communication through the wireless communication terminal 200. For example, the communication control unit 230 controls communication using a plurality of wireless communication paths selected by the communication control device 100. The communication control unit 230 performs control to distribute communication data of each type to a predetermined wireless communication path. Specific content of the control by the communication control unit 230 is set by the communication setting unit 270 to be described below.

The communication control unit 230 generates the transmission packets with respect to the transmission data on the basis of the setting by the communication setting unit 270, and transmits the transmission packets through the communication unit 220, using the wireless communication paths of the distribution destination according to the type of the transmission data. In this case, when the distribution destination with respect to the type of one transmission data is two or more wireless communication paths, the communication control unit 230 distributes the transmission packets of the transmission data of the corresponding type to the two or more wireless communication paths and transmits the transmission packets by the communication unit 220. The communication control unit 230 receives the transmission data with respect to the communication service from the central control unit 250 and notifies the type of the transmission data.

Meanwhile, the communication control unit 230 couples the reception packets received using the wireless communication path on the basis of the setting by the communication setting unit 270, and acquires the reception data. In this case, when the distribution destination with respect to the type of one reception data is one wireless communication path, the communication control unit 230 couples the reception packets received in only one wireless communication path and acquires the reception data of the corresponding type. When the distribution destination with respect to the type of one reception data is two or more wireless communication paths, the communication control unit 230 couples the reception packets received using the two or more wireless communication paths and acquires the reception data of the corresponding type. In this case, coupling the packets means coupling the data extracted from the packets (that is, data obtained by removing a header from the packets).

For example, when a communication service is the video distribution and a combination of the wireless communication paths corresponds to a combination number 18 of FIG. 7, as illustrated in FIG. 7, the distribution destination of audio data and video data of a low frequency component is the wireless communication path of WCDMA. Therefore, the communication control unit 230 extracts data from the packets received in only the wireless communication path of WCDMA, couples the extracted data, and acquires a series of audio data or a series of video data of a low frequency component. The wireless communication paths of the distribution destination of the video data of the high frequency component are the wireless communication path of IEEE802.11a and the wireless communication path of IEEE802.11g. Therefore, the communication control unit 230 extracts the data from the reception packets received in both the wireless communication path of IEEE802.11a and the wireless communication path of IEEE802.11g, couples the extracted data, and acquires the series of video data of the high frequency component.

When the distribution destination with respect to the type of one communication data is two or more wireless communication paths, the distribution and the coupling of the packets by the wireless communication terminal 200 or the processing executing device can be performed as follows. The transmission-side device gives the same identification information to each packet of each communication data of the type, such that the packets of the communication data of the type are coupled correctly by the reception-side device. The transmission-side device gives a sequence number showing order of each packet to each packet of each communication data of the type. In this case, the reception-side device couples the packets having the same identification information among the packets received using the two or more wireless communication paths using the sequence number. The identification information may be an identifier (ID) that is included in an IP packet and the sequence number may be a fragment offset (FO) that is included in the IP packet. The distribution and the coupling of the packets may be realized using the technology disclosed in Japanese Laid-Open Patent Publication No. 2000-216815.

(Position/Time Information Acquiring Unit 240)

The position/time information acquiring unit 240 acquires position information (latitude and longitude) of the wireless communication terminal 200, using a global positioning system (GPS). The position/time information acquiring unit 240 acquires time information from a reference clock included by the wireless communication terminal 200 and an external time server. The position information and the time information may be stored in the storage unit 254 through the central control unit 250.

(Central Control Unit 250)

The central control unit 250 controls the entire wireless communication terminal 200. For example, the central control unit 250 executes the software for the wireless communication terminal with respect to the communication service. The central control unit 250 provides the transmission data from the software to the communication control unit 230 and receives the reception data with respect to the software from the communication control unit 230. When the central control unit 250 provides the transmission data to the communication control unit 230 and when the central control unit 250 receives the reception data from the communication control unit 230, the central control unit 250 notifies the communication control unit 230 of the type of data. For example, in a video distribution service of FIG. 7, when the central control unit 250 provides the audio data to the communication control unit 230, the central control unit 250 notifies the communication control unit 230 that the provided data is the audio data. Thereby, the data can be distributed by the communication control unit 230.

When the wireless communication terminal 200 is connected to a new access point, the central control unit 250 acquires the ID of the access point. The ID of the access point and acquisition time thereof are stored in the storage unit 254.

The central control unit 250 provides a service ID of a communication service read by the ID reading control unit 290 to be described below and information regarding the communication service to the user through the terminal input/output unit 252. The central control unit 250 acquires input information through the terminal input/output unit 252 and specifies the communication service selected by the user. Then, the central control unit 250 transmits the service ID of the communication service selected by the user to the communication control unit 100 and requests the communication control unit 100 to provide the communication service. The ID of the wireless communication terminal 200 and information regarding the position of the wireless communication terminal 200 are transmitted with the service ID. The information regarding the position may be an ID of the recently connected access point, among the IDs of the access points stored in the storage unit 254. The information regarding the position may be position information (latitude and longitude) of the wireless communication terminal 200 that is acquired by the position/time information acquiring unit 240. The information regarding the wireless communication terminal 200 or the information regarding the user of the wireless communication terminal 200 may be transmitted to the communication control device 100. For example, information of the wireless communication method that is supported by the wireless communication terminal 200 may be transmitted with the service ID.

(Terminal Input/Output Unit 252)

The terminal input/output unit 252 provides information such as audio, an image, and video to the user of the wireless communication terminal 200. The terminal input/output unit 252 may display an image provided by the central control unit 250 on a touch panel provided in the wireless communication terminal 200. For example, an ID of a communication service read by the ID reading control unit 290 to be described below, a name of the communication service, and an image showing the description of the communication service as a list may be displayed on the touch panel. The terminal input/output unit 252 may display the image on any display device, instead of the touch panel.

The terminal input/output unit 252 acquires input information according to an input operation from the user to operate the wireless communication terminal 200. The terminal input/output unit 252 detects a touch on the touch panel provided in the wireless communication terminal 200 and acquires touch information showing a position and a type (tap or drag) of the touch as the input information. For example, the terminal input/output unit 252 detects the touch to select the communication service on the touch panel displaying an image of a list of the communication services and acquires the touch information of the touch. The terminal input/output unit 252 may acquire the input information through a keyboard, a mouse, a remote controller, a camera, and a microphone, instead of the touch panel.

(Storage Unit 254)

The storage unit 254 stores various information in the wireless communication terminal 200. For example, the storage unit 254 stores the software setting information for the wireless communication terminal that is transmitted from the communication control device 100. The storage unit 254 stores information such as the service ID of the communication service that is acquired by the ID reading control unit 290 to be described below. The storage unit 254 stores an ID of the access point connected by the wireless communication terminal 200 and acquisition time thereof. The storage unit 254 may store the position information and the time information that are acquired by the position/time information acquiring unit 240.

(Power Saving Control Unit 260)

The power saving control unit 260 performs control to decrease consumption power of the wireless communication terminal 200. For example, the power saving control unit 260 switches between a normal mode and a power saving mode according to an input operation from the user or automatically according to predetermined conditions. In the case of the power saving mode, the wireless communication terminal 200 may be set to perform communication using only one wireless communication path, regardless of an instruction from the communication control device 100.

(Communication Setting Unit 270)

When an instruction of communication setting is received from the communication control device 100, the communication setting unit 270 sets the communication control unit 230 to perform communication using the wireless communication path according to the instruction. The communication setting unit 270 may set the software that is executed by the communication unit 220 or the central control unit 250. For example, the communication setting unit 270 receives an instruction to request that setting to communicate with the processing executing device 400 and the processing executing device 600 using the plurality of wireless communication paths be performed, from the communication control device 100. In this case, the communication setting unit 270 sets the software executed by the communication control unit 230, the communication unit 220, and the central control unit 250 to communicate with the processing executing device 400 and the processing executing device 600 using the plurality of wireless communication paths. In particular, specific setting content with respect to the communication control unit 230 is as described in the explanation of the communication control unit 230.

(Communication Quality Managing Unit 280)

The communication quality managing unit 280 receives an instruction of connection confirmation from the communication control device 100 and measures communication quality of each wireless communication path candidate. The communication quality managing unit 280 first determines whether each wireless communication path candidate satisfies the predetermined communication quality on the basis of the measurement result, and provides the determination result of the communication quality of each wireless communication path candidate to the communication control device 100. The communication control device 100 may perform the determination based on the measurement result. In this case, the communication quality managing unit 280 provides the measurement result of the communication quality of each wireless communication path candidate to the communication control device 100.

The communication quality managing unit 280 regularly measures the communication quality of the set wireless communication paths, while receiving the communication service provided from at least one processing executing device. For example, the communication quality managing unit 280 determines whether each of the set wireless communication paths satisfies the predetermined communication quality. The communication quality managing unit 280 determines whether a part of or all of the set wireless communication paths should be changed on the basis of the determination result of the communication quality of the set wireless communication paths. When any one of the wireless communication paths does not satisfy the predetermined communication quality, the communication quality managing unit 280 determines that the wireless communication path should be changed. The communication quality managing unit 280 may determine whether the previously made wireless communication path selection table 158 should be changed on the basis of the movement situation of the wireless communication terminal 200 at the previous communication setting. The determination result by the communication quality managing unit 280 is provided to the communication control device 100. The communication control device 100 may perform the determination. In this case, the communication quality managing unit 280 provides the measurement result of the communication quality of each wireless communication path candidate to the communication control device 100.

(ID Reading Control Unit 290)

The ID reading control unit 290 reads the service ID of the communication service from any information source. For example, the information source may be information provided with a beacon of a wireless LAN, a broadcast signal from a femtocell, a barcode, a two-dimensional barcode, and radio frequency identification (RFID). The service ID that is read by the ID reading control unit 290 is stored in the storage unit 254.

[2.3. Configuration of Processing Executing Device]

Figure 9:
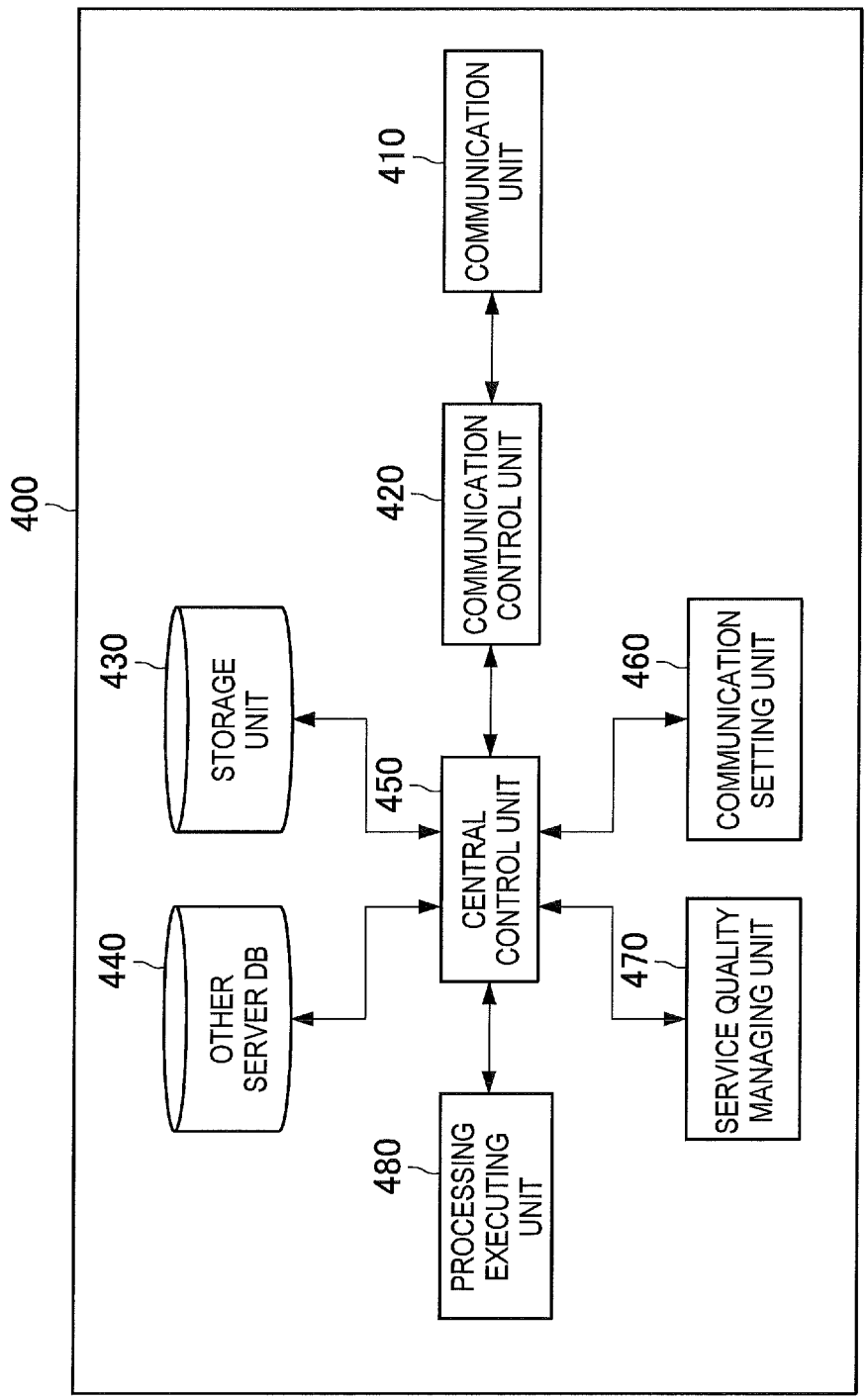
FIG. 9 is a block diagram illustrating an example of a configuration of a processing executing device according to the embodiment of the present disclosure.

A specific configuration of the processing executing device 400 according to the embodiment will be described using FIG. 9. The configuration of the processing executing device 600 may be the same as the configuration of the processing executing device 400 to be described below. Referring to FIG. 9, the processing executing device 400 includes a communication unit 410, a communication control unit 420, a storage unit 430, another server DB 440, a central control unit 450, a communication setting unit 460, a service quality managing unit 270, and a processing executing unit 480.

(Communication Unit 410)

The communication unit 410 communicates with the communication control device 100 and the wireless communication terminal 200 through the network. The communication unit 410 may have a plurality of communication circuits. The communication between the communication unit 410 and the wireless communication terminal 200 is performed through the access point.

(Communication Control Unit 420)

The communication control unit 420 controls communication through the processing executing device 400. For example, the communication control unit 420 controls communication using the wireless communication path corresponding to the processing executing device 400 among the wireless communication paths selected by the communication control device 100. When the communication control unit 420 communicates with the wireless communication terminal 200 using the plurality of wireless communication paths, the communication control unit 420 performs control to distribute the communication data of each type to the predetermined wireless communication paths. Specific content of the control through the communication control unit 420 is set by the communication setting unit 460 to be described below.

The communication control unit 420 generates the transmission packets with respect to the transmission data on the basis of the setting by the communication setting unit 460, and transmits the transmission packets by the communication unit 410, using the wireless communication path of the distribution destination according to the type of the transmission data. In this case, when the distribution destination with respect to the type of one transmission data is two or more wireless communication paths, the communication control unit 420 distributes the transmission packets of the transmission data of the corresponding type to the two or more wireless communication paths and transmits the transmission packets through the communication unit 410. The communication control unit 420 receives the transmission data with respect to the communication service from the processing executing unit 480 through the central control unit 450 and notifies the type of the transmission data.

Meanwhile, the communication control unit 420 couples the reception packets received using the wireless communication path on the basis of the setting by the communication setting unit 460, and acquires the reception data. In this case, when the distribution destination with respect to the type of one reception data is one wireless communication path, the communication control unit 420 couples the reception packets received in only one wireless communication path and acquires the reception data of the corresponding type. When the distribution destination of the type of one reception data is two or more wireless communication paths, the communication control unit 420 couples the reception packets received using the two or more wireless communication paths and acquires the reception data of the corresponding type. In this case, coupling the packets means coupling the data extracted from the packets (that is, data obtained by removing a header from the packets).

For example, as illustrated in FIG. 1, it is assumed that the processing executing device 400 is a processing executing device to perform communication using the wireless communication path corresponding to WCDMA. In this case, when a communication service is the video distribution and a combination of the wireless communication paths corresponds to a combination number 18 of FIG. 7, as illustrated in FIG. 7, the processing executing device 400 performs the processing and the transmission relating to the audio data and the video data of the low frequency component. Therefore, the communication control unit 420 generates the transmission packets of the audio data and the video data of the low frequency component and transmits the transmission packets through the communication unit 410 using the wireless communication path of WCDMA. Meanwhile, like the processing executing device 600 illustrated in FIG. 1, it is assumed that the processing executing device 400 is a processing executing device performing communication using the wireless communication path of IEEE802.11a and the wireless communication path of IEEE802.11g. In this case, when a communication service is the video distribution and a combination of the wireless communication paths corresponds to the combination number 18 of FIG. 7, as illustrated in FIG. 7, the processing executing device 400 performs the processing and the transmission relating to the video data of the high frequency component. Therefore, the communication control unit 420 generates the transmission packets of the video data of the high frequency component, distributes the transmission packets to the wireless communication path of IEEE802.11a and the wireless communication path of IEEE802.11g, and transmits the transmission packets through the communication unit 410.

The distribution and the coupling of the packets in the processing executing device 400 when the distribution destination with respect to the type of one communication data is two or more wireless communication paths can be realized as described in the explanation of the communication control unit 230 of the wireless communication terminal 200.

(Storage Unit 430)

The storage unit 430 stores various information in the processing executing device 400. For example, the storage unit 430 stores the software setting information for the processing executing device that is transmitted from the communication control device 100.

(Other Server DB 440)

The other server DB 440 stores information that is necessary for cooperating with other processing executing devices communicating with the wireless communication terminal 100. The other server DB 440 stores IDs of other processing executing devices, IP addresses of other processing executing devices, IDs of the wireless communication terminals receiving a service provided by other processing executing devices, and information indicating a provision relation of a communication service between other processing executing devices and the processing executing device 400. The information indicating the provision relation of the communication service includes information to identify a master device and a slave device when the plurality of processing executing devices provide the communication service in cooperation with each other. When the processing executing device 400 is the master device, the processing executing device 400 transmits an instruction to the other processing executing device (that is the slave device). Meanwhile, when the processing executing device 400 is the slave device, the processing executing device 400 receives an instruction from the other processing executing device (that is the master device). With respect to the processing executing device that does not directly cooperate with the processing executing device 400, information "none" may be stored in the other server DB 440. The information that is stored in the other server DB 440 may be received with an instruction of the communication setting from the communication control device 100.

(Central Control Unit 450)

The central control unit 450 controls the entire processing executing device 400.

(Communication Setting Unit 460)

When the instruction of the communication setting is received from the communication control device 100, the communication setting unit 460 sets the communication control unit 420 to perform communication using the wireless communication path according to the instruction. The communication setting unit 460 may set the software that is executed by the communication unit 410 or the processing executing unit 480. For example, an instruction to request that setting to perform communication with the wireless communication terminal 200 using at least one wireless communication path corresponding to the processing executing device 400 among the plurality of wireless communication paths selected by the communication control device 100 be performed is received from the communication control device 100. In this case, the communication setting unit 460 sets the software executed by the communication control unit 420, the communication unit 410, and the processing executing unit 480 to perform communication with the wireless communication terminal 200 using at least one wireless communication path. In particular, specific setting content with respect to the communication control unit 420 is as described in the explanation of the communication control unit 420.

(Service Quality Managing Unit 470)

The service quality managing unit 470 measures a use situation of resources of the processing executing device 400. Specific measurement items are CPU utilization, memory utilization, and disk utilization of the processing executing device 400. The service quality managing unit 470 determines whether the service quality may be lowered on the basis of measurement values of the measurement items and a predetermined threshold value. For example, when it is determined that the service quality may be lowered, the service quality managing unit 470 may request the communication control device 100 to change the processing executing device.

(Processing Executing Unit 480)

The processing executing unit 480 executes processing for providing the communication service to the wireless communication terminal 100. For example, as illustrated in FIG. 1, the processing executing device 400 performs communication using the wireless communication path of WCDMA. In this case, when the type of communication service is the video distribution and a combination of the wireless communication paths corresponds to a combination number 18 of FIG. 7, as illustrated in FIG. 7, the processing executing device 400 performs the processing relating to the audio data and the video data of the low frequency component, with respect to the video distribution service. The processing executing device 480 may execute the processing for providing the communication service with a virtual machine of Java (registered trademark) or under another execution environment.

The processing executing unit 480 cooperates with other processing executing devices according to necessity, with respect to the processing for providing the communication service to the wireless communication terminal 100. The processing executing unit 480 identifies a relation with other processing executing devices, from the "information indicating the provision relation of the communication service" between other processing executing devices and the processing executing device 400 stored in the other server DB 440. For example, if the information showing the provision relation of the communication service between the processing executing device 400 and the processing executing device 600 shows that the processing executing device 400 is the master device, the processing executing unit 480 transmits an instruction of the processing for providing the communication service to the processing executing device 600 through the communication unit 410.

<3. Flow of Processing>

Hereinafter, a flow of processing of a communication system 1 and a flow of processing of each device according to the embodiment will be described using FIGS. 10 to 20.

[3.1. Flow of Processing at Time of Setting Wireless Communication Path]

(Flow of Processing of Communication System 1)

Figure 10:
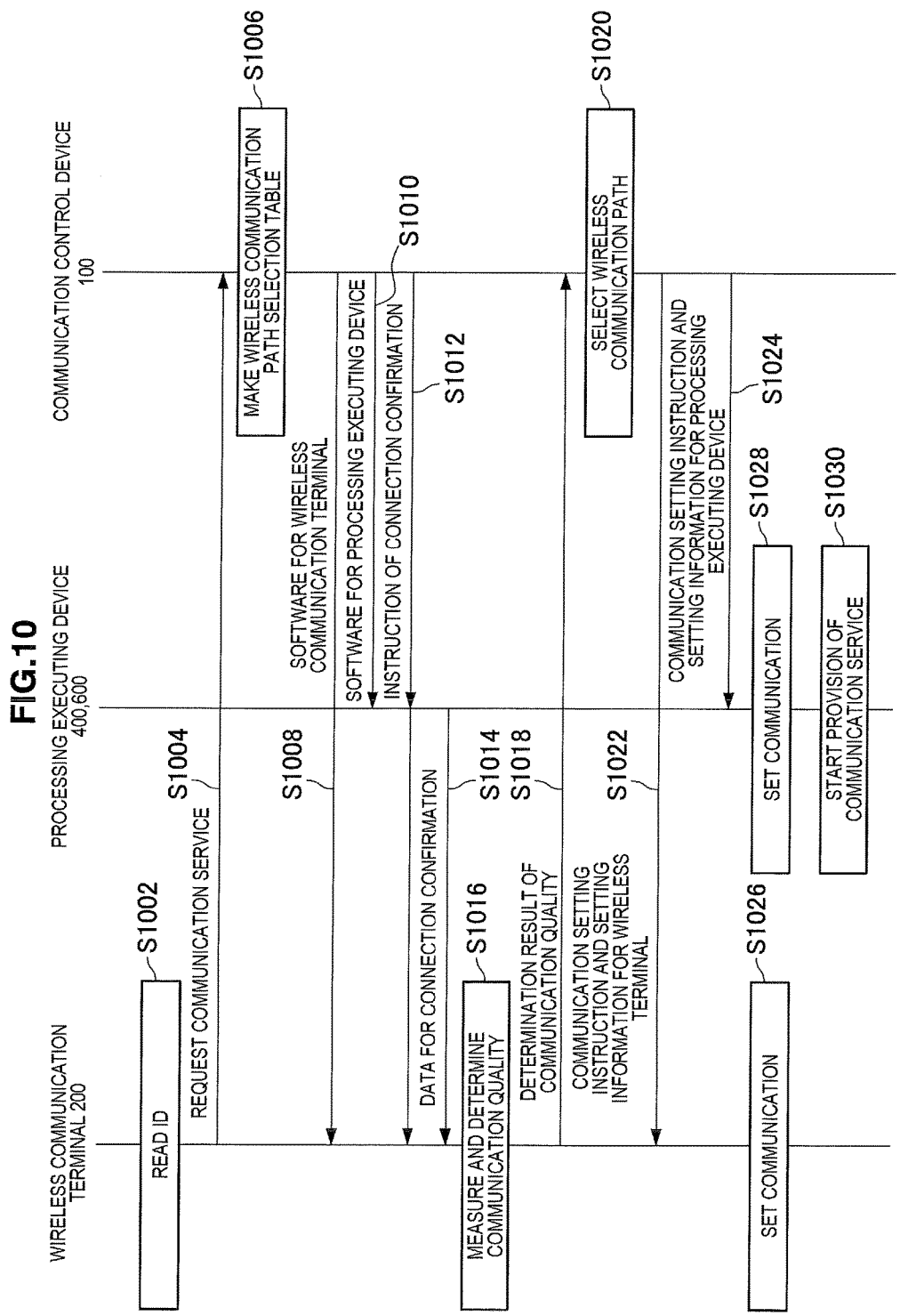
FIG. 10 is a sequence diagram illustrating an example of an operation of a communication system at the time of setting a wireless communication path.

First, the flow of the processing of the communication system 1 at the time of setting a wireless communication path will be described using FIG. 10. FIG. 10 is a sequence diagram illustrating an example of an operation of the communication system 1 at the time of setting the wireless communication path.

Referring to FIG. 10, first, in step S1002, the wireless communication terminal 200 reads the service ID of the communication service. Next, in step S1004, the wireless communication terminal 200 requests the communication control device 100 to provide the communication service. At this time, the wireless communication terminal 200 transmits the service ID of the read communication service (or the communication service selected by the user), the ID of the wireless communication terminal 200, and the information regarding the position of the wireless communication terminal 200 to the communication control device 100.

Next, in step S1006, the communication control device 100 makes the wireless communication path selection table 158 showing the combinations of the wireless communication path candidates and the priorities thereof, as illustrated in FIG. 15 to be described below. In step S1008, the communication control device 100 provides the software for the wireless communication terminal to the wireless communication terminal 200. In this case, the provided software can be used for measurement (connection confirmation) of the communication quality of the wireless communication path candidates. The software may be software executed by the wireless communication terminal with respect to the communication service. In step S1010, the communication control device 100 provides the software for the processing executing device to the processing executing devices 400 and 600. In step S1012, the communication control device 100 instructs the wireless communication terminal 200 and the processing executing devices 400 and 600 to perform the connection confirmation using the wireless communication path candidates. The processing executing devices that receive the software and are instructed to perform the connection confirmation are described as the processing executing devices 400 and 600, for the convenience of the description. However, it should be noted that other processing executing device corresponding to the wireless communication path candidates listed in step S1006 can become an object of the connection confirmation.

Next, in step S1014, the processing executing device 400 or the processing executing device 600 transmits data for the connection confirmation to the wireless communication terminal 200, using the wireless communication path candidate. The data for the connection confirmation may be data in the application software with respect to the communication service or dummy data for the connection confirmation. Next, in step S1016, the wireless communication terminal 200 measures the communication quality of the wireless communication path candidates, according to reception of the data for the connection confirmation, and determines whether the wireless communication path candidates satisfy the predetermined communication quality. In step S1018, the wireless communication terminal 200 transmits the determination result of the communication quality to the communication control device 100. Steps S1012 to S1018 may be executed with respect to all of the wireless communication path candidates listed in step S1006.

Next, in step S1020, the communication control device 100 selects the wireless communication paths from the wireless communication path candidates satisfying the predetermined communication quality, using the wireless communication path selection table 158. In this case, it is assumed that the plurality of wireless communication paths corresponding to the processing executing devices 400 and 600 are selected. In step S1022, the communication control device 100 transmits the software setting information for the wireless communication terminal by which the wireless communication terminal 200 communicates with the processing executing devices 400 and 600 using the selected wireless communication paths to the wireless communication terminal 200 and instructs the wireless communication terminal 200 to perform the communication setting using the setting information. In step S1024, the communication control device 100 transmits the software setting information for the processing executing device by which the processing executing devices 400 and 600 communicate with the wireless communication terminal 200 using the selected wireless communication paths to the processing executing devices 400 and 600 corresponding to the selected wireless communication paths. The communication control device 100 instructs the processing executing devices 400 and 600 to perform the communication setting using the setting information. The software setting information may be setting information to set at least one of application software, an operating system, and a device driver.

In step S1026, the wireless communication terminal 200 performs the communication setting using the software setting information for the wireless communication terminal. In step S1028, the processing executing devices 400 and 600 perform the communication setting using the software setting information for the processing executing device. In step S1030, the processing executing devices 400 and 600 start provision of the communication service with respect to the wireless communication terminal 200.

(Flow of Processing of Communication Control Device 100)

Figure 11:
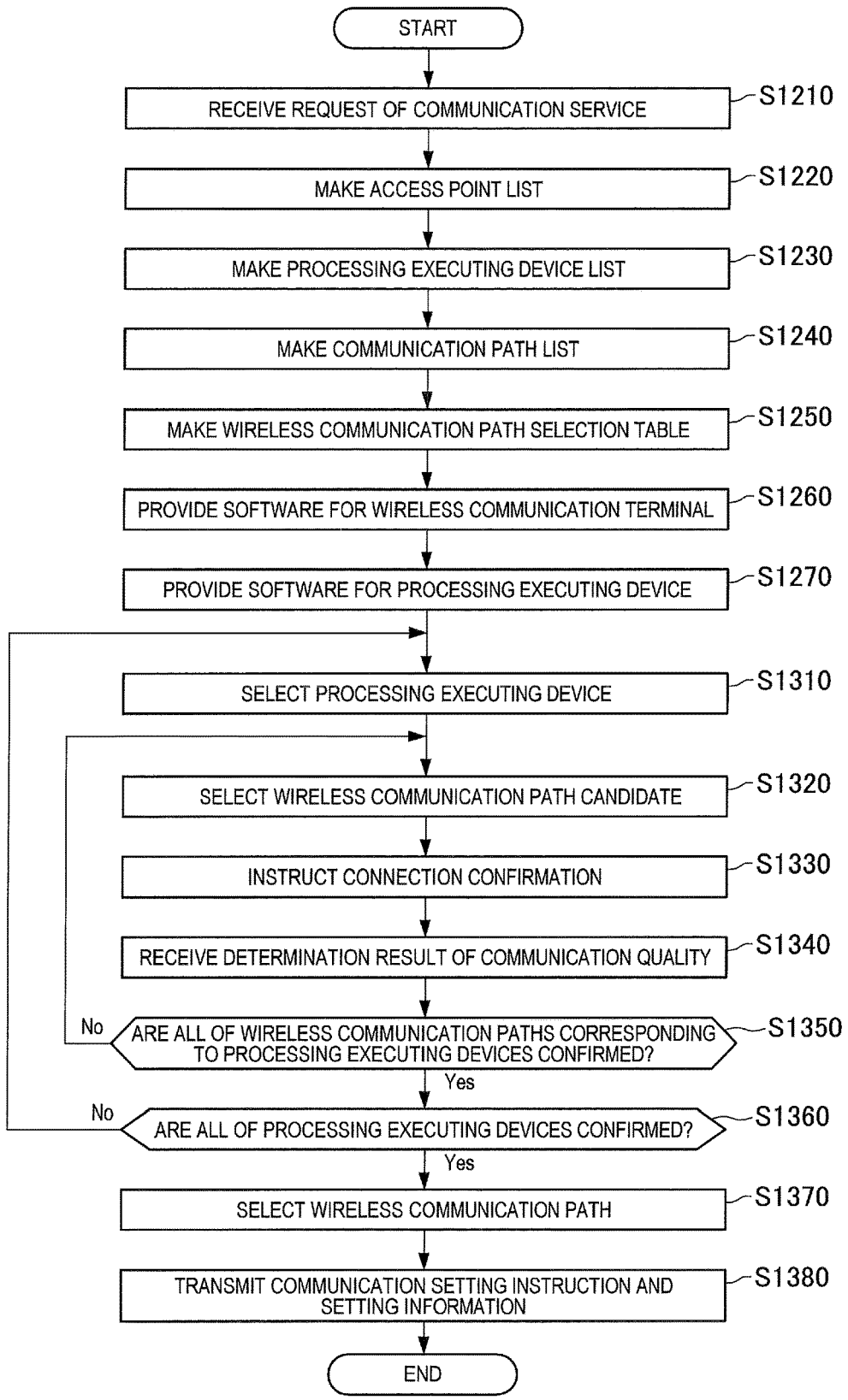
FIG. 11 is a flowchart illustrating an example of a schematic flow of processing in a communication control device at the time of setting the wireless communication path.

Next, the flow of the processing of the communication control device 100 at the time of setting the wireless communication path will be described using FIG. 11. FIG. 11 is a flowchart illustrating an example of a schematic flow of processing in the communication control device 100 at the time of setting the wireless communication path.

Referring to FIG. 11, first, in step S1210, the communication unit 194 receives the request of the communication service from the wireless communication terminal 200. At this time, the service ID of the communication service, the ID of the wireless communication terminal 200, and the information regarding the position of the wireless communication terminal 200 are received. Specifically, it is assumed that the communication service ID is S2 to be the ID of the video distribution.

Next, in step S1220, the communication path selecting unit 160 selects the access point candidates and makes the access point list 152. For example, the information regarding the position is an ID of the access point recently connected by the wireless communication terminal 200 and is, specifically, an ID called AP2 . Referring to the access point table 112 illustrated in FIG. 3, the access points that are arranged near the access point AP2 are the access points AP1 and AP3. Therefore, the access point candidates become the access points AP1, AP2, and AP3. The communication path selecting unit 160 makes the access point list 152 illustrated in FIG. 12.

Next, in step S1230, the communication path selecting unit 160 selects the processing executing device candidates and makes the processing executing device list 154. Referring to the processing executing device table 122 illustrated in FIG. 4, the processing executing device P 1 corresponds to the access point AP1 and the processing executing device P2 corresponds to the access points AP2 and AP3. Therefore, the processing executing device candidates become the processing executing devices P1 and P2. The communication path selecting unit 160 makes the processing executing device list 154 illustrated in FIG. 13.

Next, in step S1240, the communication path selecting unit 160 makes the wireless communication path list 156 of the wireless communication path candidates. If the IDs of the wireless communication paths are set as C1, C2, and C3, the wireless communication path list 156 illustrated in FIG.

14 is made from the access point list 152 illustrated in FIG. 12 and the processing executing device list 154 illustrated in FIG. 13.

Next, in step S1250, the communication path selecting unit 160 makes the wireless communication path selection table 158 showing the combinations of the wireless communication path candidates and the priorities of the combinations. As illustrated in FIG. 14, the set of the wireless communication methods corresponding to the wireless communication path candidates becomes WCDMA, IEEE802.11a, and IEEE802.11g. As described above, the communication service is the video distribution in which the service ID is S2. Referring to the priority table 134 illustrated in FIG. 6, the set of the wireless communication methods corresponds to a set number k on the table. Therefore, the priority of the combination of the wireless communication path candidates is known from the "priority of the combination of the wireless communication methods" having the set number k. The communication path selecting unit 160 makes the wireless communication path selection table 158 illustrated in FIG. 15, according to the priority.

In step S1260, the communication setting control unit 170 provides the software for the wireless communication terminal to the wireless communication terminal 100. In step S1270, the communication setting control unit 170 provides the software for the processing executing device to the processing executing devices 400 and 600. In this case, the software is software that is executed to provide the video distribution.

Next, in the processes from steps S1310 to S1360, the communication path selecting unit 160 makes the connection confirmation with respect to each wireless communication path candidate executed by the wireless communication terminal 100, the processing executing device 400 having the ID of P1, and the processing executing device 600 having the ID of P2. As a result, the wireless communication path candidates that satisfy the predetermined communication quality become clear. For example, it is assumed that all of the wireless communication path candidates C1 to C3 satisfy the predetermined communication quality.

Next, in step S1370, the communication path selecting unit 160 selects the wireless communication path candidates C1, C2, and C3 included in the combination of the wireless communication path candidates having the priority of "1" as the wireless communication paths on the basis of the wireless communication path selection table 158 illustrated in FIG. 15. In step S1380, the communication control unit 170 acquires the software setting information for the wireless communication terminal of T001_18 from the setting information storage unit 144 as illustrated in FIG. 15 and transmits the software setting information to the wireless communication terminal 200 through the communication unit 194. The communication setting information unit 170 instructs the wireless communication terminal 200 to perform the communication setting using the software setting information. Likewise, the communication setting control unit 170 transmits the software setting information for the processing executing device of P001_18 to the processing executing devices 400 and 600 through the communication unit 194 and instructs the processing executing devices 400 and 600 to perform the communication setting using the software setting information. Then, the process ends. The software setting information for the processing executing device of P001_18 may include the software setting information corresponding to the processing executing device 400 and the software setting information corresponding to the processing executing device 600. In this case, the processing executing devices 400 and 600 may acquire the software setting information corresponding to the self devices. For example, in the cooperation between the processing executing devices when the communication service is provided, the processing executing device 400 is the master device and the processing executing device 600 is the slave device. In this case, the software setting information for the master device is transmitted to the processing executing device 400 and the software setting information for the slave device is transmitted to the processing executing device 600. As a result, the processing executing device 400 transmits an instruction to the processing executing device 600 and the processing executing device 600 performs the processing and the communication according to the instruction from the processing executing device 400. As a result, like the combination having the combination number of 18 in FIG. 7, the processing executing device 400 processes and transmits the audio data and the video data of the low frequency component and the processing executing device 600 processes and transmits the video data of the high frequency component according to the instruction from the processing executing device 400.

(Flow of Processing of Wireless Communication Terminal 200)

Figure 16:
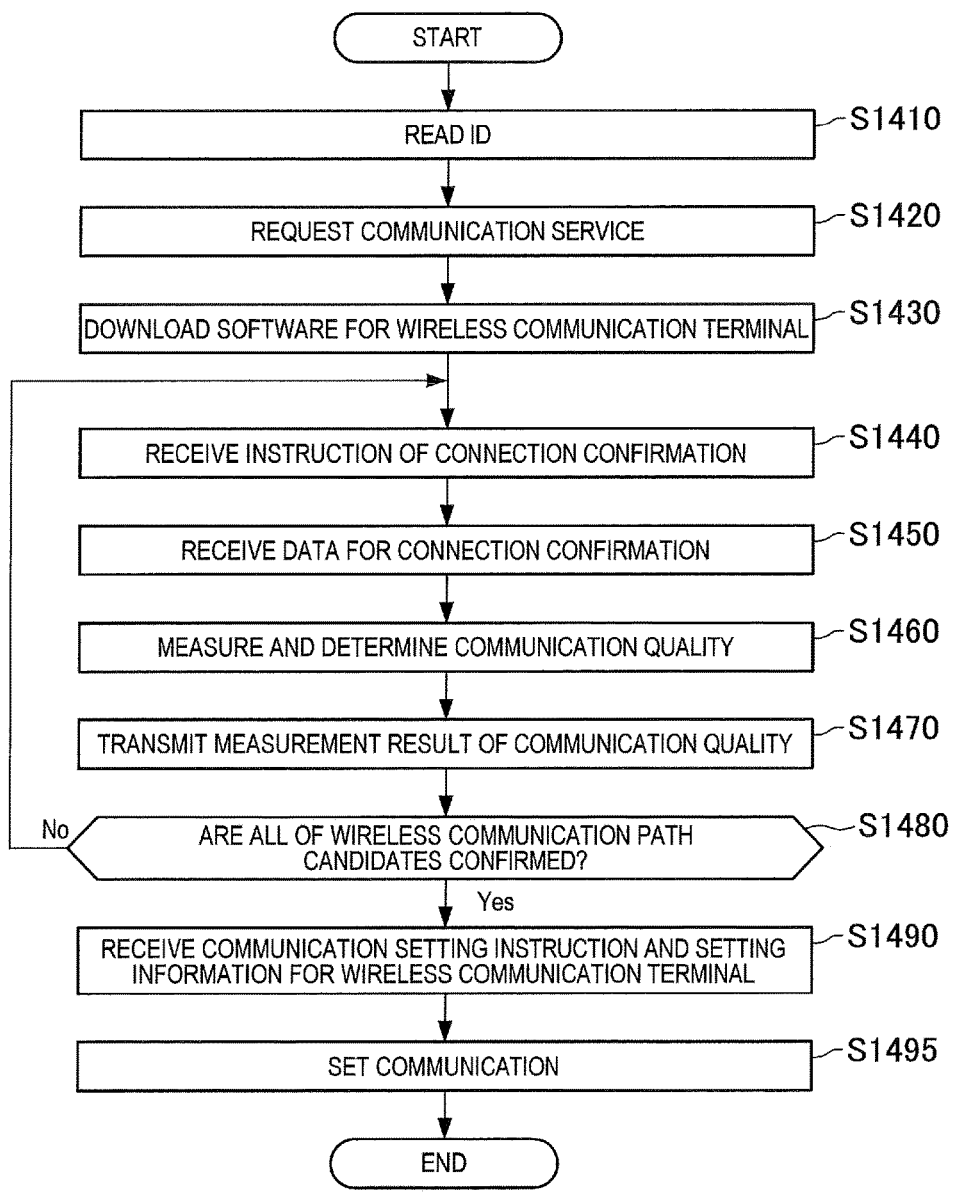
FIG. 16 is a flowchart illustrating an example of a schematic flow of processing in a wireless communication terminal at the time of setting the wireless communication path.

Next, a flow of processing of the wireless communication terminal 200 at the time of setting the wireless communication path will be described using FIG. 16. FIG. 16 is a flowchart illustrating an example of a schematic flow of processing in the wireless communication terminal 200 at the time of setting the wireless communication path.

Referring to FIG. 16, first, in step S1410, the ID reading control unit 290 reads the service ID of the communication service. Specifically, it is assumed that the ID reading control unit 290 reads S2 to be the ID of the video distribution, from the information transmitted with the beacon from the access point having the ID of AP2. In step S1420, the central control unit 250 requests the communication control device 100 to provide the communication service according to the selection of the communication service from the user. According to the request of the communication service, the service ID of the communication service, the ID of the wireless communication terminal 200, and the information regarding the position of the wireless communication terminal 200 are transmitted. In this case, AP2 to be the ID of the access point is transmitted as the information regarding the position of the wireless communication terminal 200.

Next, in step S1430, the communication unit 220 receives the software for the wireless communication terminal from the communication control device 100. In this case, the software is software to receive the video distribution.

Next, in step S1440, the communication unit 220 receives an instruction of the connection confirmation with respect to the wireless communication path candidates, from the communication control device 100. In this case, the wireless communication path candidates are wireless communication path candidates in which the IDs are C1 to C3, as illustrated in FIG. 14. Next, in step S1450, the communication unit 220 receives the data for the connection confirmation from the processing executing apparatus 400 or 600, using one of the wireless communication path candidates. In step S1460, the communication quality managing unit 280 measures the communication quality of the wireless communication path candidates according to the reception of the data for the connection confirmation and determines whether the wireless communication path candidates satisfy the predetermined communication quality. In step S1470, the communication unit 220 transmits the determination result of the communication quality to the communication control device 100. In step S1480, if the connection confirmation of all of the wireless communication path candidates is performed, the process proceeds to step S1490. If there is a wireless communication path candidate in which the connection confirmation is not performed, the process returns to step S1440. In this case, it is determined that all of the wireless communication path candidates C1 to C3 satisfy the predetermined communication quality.

Next, in step S1490, the communication unit 220 receives the software setting information for the wireless communication terminal and the instruction of the communication setting using the software setting information, from the communication control device 100. In this case, the software setting information for the wireless communication terminal of T001_18 illustrated in FIG. 15 is received. Next, in step S1495, the communication setting unit 270 sets the software to receive the video distribution to be executed by the communication control unit 230, the communication unit 220, and the central control unit 250, using the software setting information for the wireless communication terminal. As a result, the wireless communication terminal 200 receives the audio data and the video data of the low frequency component using the wireless communication path of WCDMA and receives the video data of the high frequency component using the wireless communication paths of the two wireless LAN systems, as illustrated by the combination number of FIG. 7.

(Flow of Processing of Processing Executing Device 400)

Figure 17:
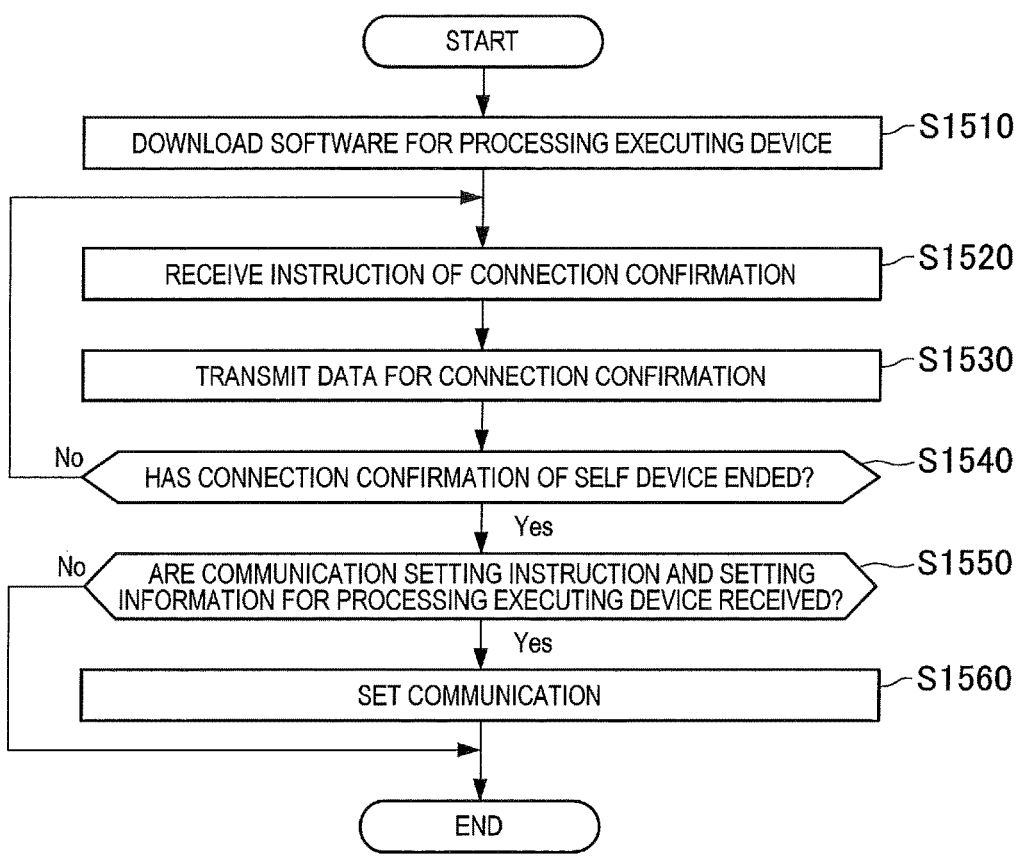
FIG. 17 is a flowchart illustrating an example of a schematic flow of processing in a processing executing device at the time of setting the wireless communication path.

Next, a flow of processing of the processing executing device 400 at the time of setting the wireless communication path will be described using FIG. 17. FIG. 17 is a flowchart illustrating an example of a schematic flow of processing in the processing executing device 400 at the time of setting the wireless communication path. The flow of the processing in the processing executing device 600 may be the same as the flow of the processing in the processing executing device 400 to be described below.

Referring to FIG. 17, first, in step S1510, the communication unit 410 receives the software for the processing executing device provided from the communication control device 100. In this case, the software is software to provide the communication service of the video distribution.

Next, in step S1520, the communication unit 410 receives the instruction of the connection confirmation with respect to the wireless communication path candidate, from the communication control device 100. If the ID of the processing executing device 400 is P1, the wireless communication path candidate is the wireless communication path candidate C1, as illustrated in FIG. 14. Next, in step S1530, the communication unit 410 transmits the data for the connection confirmation to the wireless communication terminal 200 using one (that is, the wireless communication path candidate C1) of the wireless communication path candidates as the connection confirmation. In step S1540, if the connection confirmation of all of the wireless communication path candidates with respect to the processing executing device 400 ends, the process proceeds to step S1550. If there is a wireless communication path candidate in which the connection confirmation is not performed, the process returns to step S1520.

Next, in step S1550, if the communication unit 410 receives the software setting information for the processing executing device and the instruction of the communication setting using the software setting information from the communication control device 100, the process proceeds to step S1560. In this case, the software setting information for the wireless communication terminal of P001_18 illustrated in FIG. is received. Meanwhile, if the instruction of the communication setting is not received from the communication control device 100, the process ends. That is, this means that the wireless communication path candidate corresponding to the processing executing device 400 is not selected as the wireless communication path. In step S1560, the communication setting unit 460 sets the software to provide the communication service to be executed by the communication control unit 420, the communication unit 410, and the processing executing device, using the software setting information for the processing executing device. As illustrated in FIG. 14, the processing executing device 400 that has the ID of P1 communicates with the wireless communication terminal 200 using the wireless communication path of WCDMA having the ID of C1. As a result, the processing executing device 400 transmits the audio data and the video data of the low frequency component to the wireless communication terminal 200 using the wireless communication path of WCDMA, as illustrated in FIG. 7.

[3.2. Flow of Processing After Wireless Communication Path is Set](Flow of Processing of Communication System 1)

Figure 18:
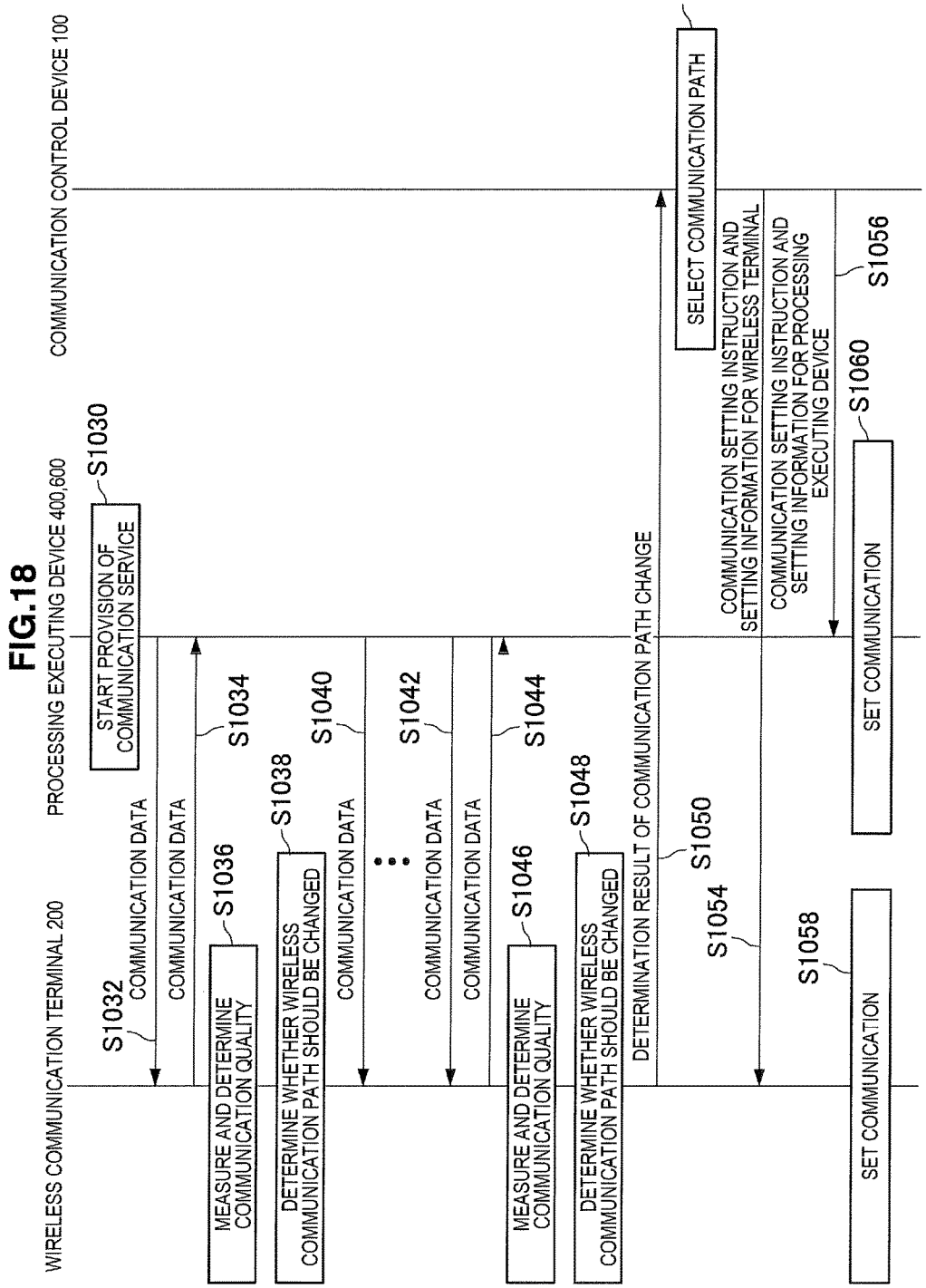
FIG. 18 is a sequence diagram illustrating an example of an operation of a communication system after the wireless communication path is set.

A flow of processing of the communication system 1 after the wireless communication path is set will be described using FIG. 18. FIG. 18 is a sequence diagram illustrating an example of an operation of the communication system 1 after the wireless communication path is set.

Referring to FIG. 18, first, in steps S1032 and S1034, the wireless communication terminal 200 and the processing executing devices 400 and 600 transmit and receive the communication data regarding the communication service. In step S1036, the wireless communication terminal 200 measures the communication quality of the set wireless communication paths and determines whether the wireless communication paths satisfy the predetermined communication quality. In step S1038, the wireless communication terminal 200 determines whether a part of or all of the set wireless communication paths should be changed. In this case, the wireless communication terminal 200 determines that the communication paths need not be changed. In steps S1040 to S1048, the same processing is executed again. In step S1048, if the wireless communication terminal 200 determines that the communication paths should be changed, in step S1050, the wireless communication terminal 200 transmits the determination result indicating that a part of or all of the wireless communication paths should be changed to the communication control device 100. In step S1048, the wireless communication terminal 200 determines that the previously made wireless communication path selection table 158 needs not be changed, because the wireless communication terminal 200 does not move. In addition, the determination result is transmitted in step S1050.

In step S1052, the communication control device 100 starts reselection of the wireless communication path according to the determination result received in step S1050. In this case, because it is determined that the wireless communication path selection table 158 needs not be changed, the communication control device 100 reselects the wireless communication path from the existing wireless communication path selection table 158. In step S1054, the communication control device 100 transmits the setting instruction of the wireless communication path and the software setting information for the wireless communication terminal to the wireless communication terminal 200. In step S1056, the communication control device 100 transmits the setting instruction of the wireless communication path and the software setting information for the processing executing device to the processing executing devices 400 and 600. In steps S1058 and S1060, the wireless communication terminal 200 and the processing executing devices 400 and 600 perform communication setting using the software setting information.

In step S1048, if it is determined that the wireless communication path selection table 158 should be changed, the communication control device 100 executes the processes of steps S1220 to S1250 illustrated in FIG. 11 again and makes a new wireless communication path selection table 158.

(Flow of Processing of Wireless Communication Terminal 200)

Figure 19:
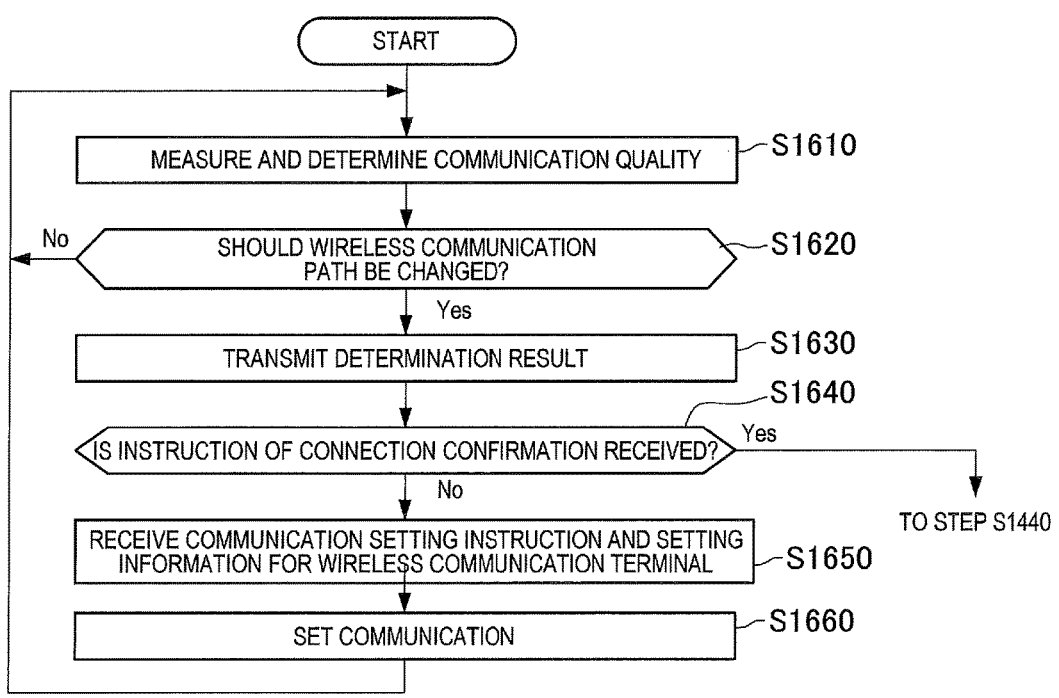
FIG. 19 is a flowchart illustrating an example of a schematic flow of processing in a wireless communication terminal after the wireless communication path is set.

Next, a flow of processing of the wireless communication terminal 200 after the wireless communication path is set will be described using FIG. 19. FIG. 19 is a flowchart illustrating an example of a schematic flow of processing in the wireless communication terminal 200 after the wireless communication path is set.

Referring to FIG. 19, first, in step S1610, the communication quality managing unit 280 measures the communication quality of the set wireless communication paths and determines whether the wireless communication paths satisfy the predetermined communication quality. In step S1620, the communication quality managing unit 280 determines whether a part of or all of the set wireless communication paths should be changed. The communication quality managing unit 280 determines whether the previously made wireless communication path selection table 158 should be changed. If the wireless communication path should be changed, the process proceeds to step S1630. If the wireless communication path needs not be changed, the process returns to step S1610. In step S1630, the communication unit 220 transmits the determination result indicating that a part of or all of the set wireless communication paths should be changed to the communication control device 100. In this case, the determination result on whether the previously made wireless communication path selection table 158 should be changed is transmitted.

Next, in step S1640, if the communication unit 220 receives the instruction of the connection confirmation, the process proceeds to step S1440 illustrated in FIG. 16, because the wireless communication path selection table 158 should be changed. If the communication unit 220 does not receive the instruction of the connection confirmation, the process proceeds to step S1650.

In step S1650, the communication unit 220 receives the setting instruction of the wireless communication path and the software setting information for the wireless communication terminal. In step S1660, the communication setting unit 270 sets the software to receive the video distribution to be executed by the communication control unit 230, the communication unit 220, and the central control unit 250 using the software setting information for the wireless communication terminal.

(Flow of Processing of Communication Control Device 100)

Figure 20:
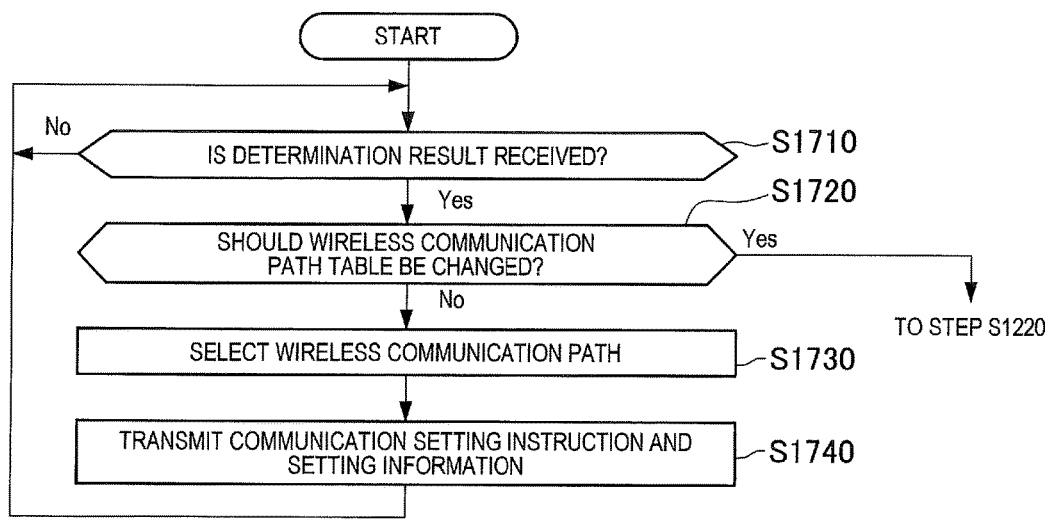
FIG. 20 is a flowchart illustrating an example of a schematic flow of processing in a communication control device after the wireless communication path is set.

Next, a flow of processing of the communication control device 100 after the wireless communication path is set will be described using FIG. 20. FIG. 20 is a flowchart illustrating an example of a schematic flow of processing in the communication control device 100 setting the wireless communication path is set.

In step S1710, if the determination result indicating that a part of or all of the set wireless communication paths should be changed is received, the process proceeds to step S1720. If the determination result is not received, the process returns to step S1710. In step S1720, the communication path selecting unit 160 identifies whether the wireless communication path selection table 158 should be changed from the determination result on whether the wireless communication path selection table 158 should be changed. If the wireless communication path selection table 158 should be changed, the process proceeds to step S1220 illustrated in FIG. 11. If the wireless communication path selection table 158 need not be changed, the process proceeds to step S1730.

In step S1730, the communication path selecting unit 160 reselects the wireless communication path from the existing wireless communication path selection table 158. In step S1740, the communication setting control unit 170 transmits the setting instruction of the wireless communication path and the software setting information for the wireless communication terminal to the wireless communication terminal 200 through the communication unit 194. The communication setting control unit 170 transmits the setting instruction of the wireless communication path and the software setting information for the processing executing device to the processing executing devices 400 and 600 through the communication unit 194.

<4. Conclusion>

The embodiment has been described using FIGS. 1 to 20. According to the embodiment, when a plurality of wireless communication paths by which the wireless communication terminal and the processing executing device communicate with each other are selected, the setting is performed such that communication is performed between the wireless communication terminal and the processing executing device using the plurality of wireless communication paths. As such, the resources of the wireless communication terminal can be sufficiently used when the communication service is provided. As a result, a communication service of high quality can be realized when the communication service is provided.

According to the embodiment, the access point candidates that can be connected to the wireless communication terminal are selected and the wireless communication paths are selected from the wireless communication path candidates between the access point candidates and the wireless communication terminal. By selecting the access point candidates, the access points to which the wireless communication terminal can be connected can be specified in full detail. As a result, the wireless communication paths can be selected from the plurality of wireless communication path candidates that can be used by the wireless communication terminal.

According to the embodiment, the wireless communication paths that are included in the combination of the wireless communication path candidates having the high priority among given combinations of the wireless communication path candidates are selected as the wireless communication paths to be used to provide the communication service. By selecting the wireless communication paths according to the priority, the wireless communication terminal can perform communication using the optimal combination of the wireless communication paths for the communication service. As a result, the service quality of the communication service can be improved.

According to the embodiment, the wireless communication path is selected from the wireless communication path candidates satisfying the predetermined communication quality among the wireless communication path candidates.

As such, the wireless communication paths are selected from only the wireless communication path candidates satisfying the predetermined communication quality, such that the communication data can be prevented from being distributed to the wireless communication paths not satisfying the predetermined communication quality. As a result, a risk of reception of data of a certain type distributed to the wireless communication path having the low communication quality becoming difficult can be decreased.

According to the embodiment, when it is determined that a part of or all of the set wireless communication paths should be changed, the selection processing and the setting control processing are executed again. As such, if the wireless communication paths are reselected and set again, communication can be performed again using an optimal combination of the wireless communication paths, even when a communication environment of the wireless communication terminal changes.

According to the embodiment, the range of the data that is transmitted using each of the plurality of wireless communication paths among the data regarding the communication service transmitted using the plurality of wireless communication paths is dynamically controlled. By the control, communication according to the use form or the characteristic of the communication service can be realized. As a result, service quality for the user can be improved.

The preferred embodiments of the present disclosure have been described in detail with reference to the appended drawings. However, a technical range of the present disclosure is not limited to the above examples. It will be apparent to those skilled in the art that various modifications and changes can be made without departing from the technical scope and spirit defined by the appended claims. Therefore, it should be understood that the various modifications and changes are included in the technical range of the present disclosure.

For example, in the embodiment, each of the processing executing device and the communication control device is a separate device. However, the present disclosure is not limited to the above example. For example, the communication control device may be one of the plurality of processing executing devices included in the communication system or may be only one processing executing device included in the communication system.

In the embodiment, the processing executing device is connected to the communication control device through the wired network. However, the present disclosure is not limited to the above example. For example, the processing executing device may be connected to the communication control device through the communication network. In this case, the processing executing device may perform communication using the two or more wireless communication paths, similar to the wireless communication terminal.

In the embodiment, the wireless communication terminal measures the communication quality of the wireless communication path candidates and the set wireless communication paths. However, the present disclosure is not limited to the above example. For example, the processing executing device may measure the communication quality.

Additionally, the present technology may also be configured as below.

(1) A communication control device comprising:
a communication path selecting unit that selects one or more wireless communication paths by which a wireless communication terminal performing communication using two or more wireless communication paths and a processing executing device executing processing for providing a communication service to the wireless communication terminal communicate with each other; and
a communication setting control unit that performs setting such that, when a plurality of wireless communication paths are selected, communication is performed between at least one processing executing device corresponding to the plurality of selected wireless communication paths and the wireless communication terminal, using the plurality of wireless communication paths.

(2) The communication control device according to (1),
wherein the communication path selecting unit selects one or more access point candidates to be connected to the wireless communication terminal and selects the one or more wireless communication paths from one or more wireless communication path candidates between the one or more access point candidates and the wireless communication terminal.

(3) The communication control device according to (2),
wherein the communication path selecting unit selects, as the one or more wireless communication paths, wireless communication paths included in a combination of the wireless communication path candidates having high priority among given combinations of the one or more wireless communication path candidates.

(4) The communication control device according to (3),
wherein the priority is priority with respect to a combination of wireless communication methods corresponding to the wireless communication path candidates included in each combination of the wireless communication path candidates.

(5) The communication control device according to (4),
wherein the priority is determined previously for each communication service.

(6) The communication control device according to any one of (2) to (5),
wherein the communication path selecting unit selects the one or more wireless communication paths from wireless communication path candidates satisfying predetermined communication quality among the one or more wireless communication path candidates.

(7) The communication control device according to (6),
wherein the communication path selecting unit selects all of the wireless communication path candidates satisfying the predetermined communication quality as the one or more wireless communication paths.

(8) The communication control device according to any one of (1) to (7),
wherein the communication setting control unit provides software or software setting information for the wireless communication terminal to perform communication using the plurality of wireless communication paths to the wireless communication terminal or provides software or software setting information for the processing executing device to perform communication using the plurality of wireless communication paths to the at least one processing executing device.

(9) The communication control device according to any one of (1) to (8),
wherein the communication setting control unit causes the wireless communication terminal to set a range of data transmitted using each of the plurality of wireless communication paths among data regarding a communication service transmitted using the plurality of wireless communication paths, and
the range of the data is determined previously according to the communication service.

(10) The communication control device according to any one of (1) to (9), wherein, when it is determined that a part of or all of the set wireless communication paths should be changed, the communication path selecting unit and the communication setting control unit execute selection processing for selecting one or more wireless communication paths and setting control processing for performing setting to perform communication using the one or more wireless communication paths again.

(11) The communication control device according to (10), further comprising:

a change determining unit that determines whether a part of or all of the set wireless communication paths should be changed on the basis of a measurement result of communication quality of the set wireless communication paths.

(12) The communication control device according to (10), wherein, when a determination result indicating that a part of or all of the set wireless communication paths should be changed is provided by the wireless communication terminal or the at least one processing executing device, the communication path selecting unit and the communication setting control unit execute the selection processing and the setting control processing again.

(13). A wireless communication terminal comprising:

a communication unit that performs communication using two or more wireless communication paths; and a communication setting unit that performs setting to communicate with at least one processing executing device using a plurality of wireless communication paths, when an instruction to request that setting to communicate with at least one processing executing device corresponding to the plurality of wireless communication paths using the plurality of wireless communication paths be performed is received from a communication control device selecting one or more wireless communication paths to communicate with the processing executing device executing processing for providing a communication service.

(14) A processing executing device comprising:

a processing executing unit that executes processing for providing a communication service to a wireless communication terminal performing communication using two or more wireless communication paths;

a communication unit that communicates with a communication control device selecting one or more wireless communication paths to communicate with the wireless communication terminal; and a communication setting unit that performs setting to communicate with the wireless communication terminal using at least one wireless communication path, when an instruction to request that setting to communicate with the wireless communication terminal using at least one wireless communication path corresponding to a self device among the plurality of wireless communication paths selected by the communication control device be performed is received from the communication control device.

(15) A communication system comprising:

a wireless communication terminal that performs communication using two or more wireless communication paths;

one or more processing executing devices that execute processing for providing a communication service to the wireless communication terminal; and a communication control device that selects one or more wireless communication paths by which the wireless communication terminal and the processing executing devices communicate with each other, wherein, when the communication control device selects a plurality of wireless communication paths, at least one processing executing device corresponding to the plurality of selected wireless communication paths and the wireless communication terminal are set to communicate with each other using the plurality of wireless communication paths.

(16) A communication control method for a communication control device that controls communication of a wireless communication terminal performing communication using two or more wireless communication paths and a processing executing device executing processing for providing a communication service to the wireless communication terminal, the communication control method comprising:

selecting one or more wireless communication paths by which the wireless communication terminal and the processing executing device communicate with each other; and performing setting such that, when a plurality of wireless communication paths are selected, communication is performed between at least one processing executing device corresponding to the plurality of selected wireless communication paths and the wireless communication terminal, using the plurality of wireless communication paths.

What is claimed is:

1. A communication control device, comprising:
a storage unit configured to:
store information of a plurality of wireless communication paths,
wherein a wireless communication terminal communicates with at least one of a plurality of processing devices via at least one of the plurality of wireless communication paths, and
wherein each of the plurality of processing devices transmits a communication service to the wireless communication terminal; and
circuitry configured to:
receive a service ID associated with a communication service request from the wireless communication terminal;
wherein the service ID includes at least a type of communication data, a first software, and first software setting information associated with the wireless communication terminal;
determine priorities of a plurality of combinations of wireless communication standards based on the service ID;
select a combination of wireless communication paths, from the plurality of wireless communication paths, based on one of the plurality of combinations of wireless communication standards that has a highest priority among the determined priorities,
wherein the combination of wireless communication paths include at least two of the plurality of wireless communication paths;
set communication, between at least one of the plurality of processing devices and the wireless communication terminal, based on the combination of wireless communication paths;
receive, from the at least one of the plurality of processing devices, communication data corresponding to the communication service;
generate packets of the communication data based on the first software setting information; and
distribute the packets to the combination of wireless communication paths, based on the type of communication data that corresponds to the combination of wireless communication paths.

2. The communication control device according to claim 1,
  wherein the circuitry is further configured to select at least one access point candidate, and connect with the wireless communication terminal based on the at least one access point candidate, and
  wherein the combination of wireless communication paths is selected from a plurality of wireless communication path candidates between the at least one access point candidate and the wireless communication terminal.

3. The communication control device according to claim 2, wherein the selection of the combination of wireless communication paths is based on a combination of the plurality of wireless communication path candidates associated with a high priority among a plurality of combinations of the plurality of wireless communication path candidates.

4. The communication control device according to claim 3, wherein the high priority is a particular priority with respect to the plurality of combinations of wireless communication standards that correspond to the plurality of wireless communication path candidates.

5. The communication control device according to claim 4, wherein the particular priority is associated with the communication service.

6. The communication control device according to claim 1, wherein the circuitry is further configured to select the combination of wireless communication paths from a plurality of wireless communication path candidates that satisfy a particular communication quality among the plurality of wireless communication path candidates.

7. The communication control device according to claim 6, wherein the circuitry is further configured to select, as the combination of wireless communication paths, each of the plurality of wireless communication path candidates, which satisfy the particular communication quality.

8. The communication control device according to claim 1,
  wherein the circuitry is further configured to communicate at least one of a second software or second software setting information to the plurality of processing devices, based on the combination of wireless communication paths.

9. The communication control device according to claim 1,
  wherein the circuitry is further configured to:
    re-select the combination of wireless communication paths, and
    set communication with the re-selected combination of wireless communication paths, based on a change of at least a part of the combination of wireless communication paths.

10. The communication control device according to claim 1, wherein the circuitry is further configured to determine a change of at least a part of the combination of wireless communication paths, based on a measurement result of a communication quality of the combination of wireless communication paths and a position of the wireless communication terminal.

11. The communication control device according to claim 10, wherein the circuitry is further configured to re-select the combination of wireless communication paths based on a reception, from at least one of the wireless communication terminal or the plurality of processing devices, of a result that indicates the change to the at least part of the combination of wireless communication paths.

12. A wireless communication terminal, comprising:
an antenna configured to communicate, via a combination of wireless communication paths, with at least one of a plurality of processing devices,
wherein each of the plurality of processing devices transmits a communication service, and
wherein the combination of wireless communication paths include at least two of a plurality of wireless communication paths; and
circuitry configured to:
  determine priorities of a plurality of combinations of wireless communication standards based on a service ID associated with a communication service request;
  receive, from a communication control device, an instruction to request a communication with each of a plurality of processing devices, based on each of the plurality of wireless communication paths in the combination of wireless communication paths;
  transmit, to the communication control device, the communication service request corresponding to the communication service,
  wherein the communication service request includes the service ID that corresponds to at least a type of communication data, a software, and software setting information associated with the wireless communication terminal;
  communicate with at least one of the plurality of processing devices based on a selection of the combination of wireless communication paths,
  wherein the combination of wireless communication paths is selected based on one of the plurality of combinations of wireless communication standards that has a highest priority among the determined priorities; and
  receive, via the combination of wireless communication paths, packets of communication data corresponding to the communication service,
    wherein the combination of wireless communication paths, on which the packets are received, corresponds to the type of communication data.

13. A processing device, comprising:
a storage unit configured to store first software setting information for communication based on a plurality of wireless communication paths, wherein the first software setting information is received from a communication control device; and
circuitry configured to:
  receive a service ID associated with a communication service request, via the communication control device, from a wireless communication terminal;
  wherein the service ID includes at least a type of communication data, a software, and second software setting information associated with the wireless communication terminal;
  determine priorities of a plurality of combinations of wireless communication standards based on the service ID;
  transmit a communication service to the wireless communication terminal,
    wherein the wireless communication terminal communicates with the processing device via a combination of wireless communication paths,
    wherein the combination of wireless communication paths include at least two of the plurality of wireless communication paths;

communicate, via the combination of wireless communication paths, with the communication control device,
wherein the combination of wireless communication paths is selected based on one of the plurality of combinations of wireless communication standards that has a highest priority among the determined priorities;
set communication between the processing device and the wireless communication terminal based on the combination of wireless communication paths;
generate packets of communication data based on the first software setting information; and
distribute the packets to the combination of wireless communication paths based on the type of communication data that corresponds to the combination of wireless communication paths.

14. A communication system, comprising:
at least one of a plurality of processing devices configured to transmit a communication service;
a wireless communication terminal configured to communicate with the at least one of plurality of processing devices via a combination of wireless communication paths; and
a communication control device configured to:
receive a service ID associated with a communication service request from the wireless communication terminal;
wherein the service ID includes at least a type of communication data, a software, and software setting information associated with the wireless communication terminal;
determine priorities of a plurality of combinations of wireless communication standards based on the service ID;
select the combination of wireless communication paths from a plurality of wireless communication paths, based on one of the plurality of combinations of wireless communication standards that has a highest priority among the determined priorities,
wherein the combination of wireless communication paths include at least two of the plurality of wireless communication paths;
set communication of the at least one of plurality of processing devices and the wireless communication terminal based on the combination of wireless communication paths;
receive, from the at least one of the plurality of processing devices, communication data corresponding to the communication service;
generate packets of the communication data based on the software setting information; and
distribute the packets to the combination of wireless communication paths based on the type of communication data that corresponds to the combination of wireless communication paths.

15. A communication control method, comprising:
in a communication control device configured to control a wireless communication terminal to communicate with a plurality of processing devices via a combination of wireless communication paths, wherein each of the plurality of processing devices transmits a communication service to the wireless communication terminal:
receiving a service ID associated with a communication service request from the wireless communication terminal;
wherein the service ID includes at least a type of communication data, a software, and software setting information associated with the wireless communication terminal;
determining priorities of a plurality of combinations of wireless communication standards based on the service ID;
selecting the combination of wireless communication paths from a plurality of wireless communication paths, based on one of the plurality of combinations of wireless communication standards that has a highest priority among the determined priorities,
wherein the combination of wireless communication paths include at least two of the plurality of wireless communication paths;
setting, based on the selection of the combination of wireless communication paths, communication between at least one of the plurality of processing devices and the wireless communication terminal;
receiving, from the at least one of the plurality of processing devices, communication data corresponding to the communication service;
generating packets of the communication data based on the software setting information; and
distributing the packets to the combination of wireless communication paths based on the type of communication data that corresponds to the combination of wireless communication paths.

16. The communication control device according to claim 1, wherein the circuitry is further configured to select at least one access point candidate, which corresponds to the plurality of combinations of wireless communication standards supported by the wireless communication terminal, based on a communication enabling distance attribute of the at least one access point candidate.

17. The communication control device according to claim 1, wherein the selection of the combination of wireless communication paths is based on a particular communication quality.

18. The communication control device according to claim 1, wherein the one of the plurality of combinations of wireless communication standards, that corresponds to the combination of wireless communication paths, comprises at least one of a cellular system, worldwide interoperability for microwave access (Wi-Max), wide-band code division multiple access (WCDMA), long terminal evolution (LTE), personal handy-phone system (PHS), IEEE 802.11a, IEEE 802.11b, or IEEE 802.11g.

19. The communication control device according to claim 18, wherein the one of the plurality of combinations of wireless communication standards, which corresponds to the combination of wireless communication paths associated with the highest priority, comprises WCDMA, IEEE 802.11a, and IEEE 802.11g.

20. The communication control device according to claim 1, wherein the type of communication data comprises at least one of audio, low frequency video, or high frequency video.

* * * * *